US009018308B2

(12) United States Patent
Moore et al.

(10) Patent No.: US 9,018,308 B2
(45) Date of Patent: Apr. 28, 2015

(54) POLYBENZIMIDAZOLE/POLYACRYLATE MIXTURES

(75) Inventors: John C. Moore, Camarillo, CA (US); Gregory S. Copeland, Tega Cay, SC (US); Michael Gruender, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 240 days.

(21) Appl. No.: 12/957,601

(22) Filed: Dec. 1, 2010

(65) Prior Publication Data

US 2011/0129601 A1 Jun. 2, 2011

Related U.S. Application Data

(60) Provisional application No. 61/265,452, filed on Dec. 1, 2009.

(51) Int. Cl.
*C08G 73/18* (2006.01)
*C08F 2/44* (2006.01)
*C09D 133/08* (2006.01)
*C08L 79/04* (2006.01)
*C08L 39/00* (2006.01)

(52) U.S. Cl.
CPC . *C08F 2/44* (2013.01); *C08L 79/04* (2013.01); *C08L 39/00* (2013.01); *C09D 133/08* (2013.01)

(58) Field of Classification Search
CPC .............. C08F 2/44; C08L 39/00; C08L 79/00–79/085; C09D 133/08
USPC .......................................... 525/183, 426, 435
See application file for complete search history.

(56) References Cited

U.S. PATENT DOCUMENTS

| 2,895,948 | A | | 7/1959 | Brinker et al. | |
| 3,174,947 | A | | 3/1965 | Marvel et al. | |
| 4,020,142 | A | * | 4/1977 | Davis et al. | 264/347 |
| 4,579,915 | A | * | 4/1986 | Choe | 525/435 |
| 4,963,628 | A | | 10/1990 | Chen, Sr. et al. | |
| 5,087,513 | A | * | 2/1992 | Kim | 442/118 |
| 5,110,883 | A | * | 5/1992 | Gartner | 526/84 |
| 5,126,013 | A | * | 6/1992 | Wiker et al. | 162/156 |
| 5,549,946 | A | | 8/1996 | Iura et al. | |
| 5,674,614 | A | | 10/1997 | Onishi et al. | |
| 6,792,991 | B2 | | 9/2004 | Thallner | |
| 6,869,894 | B2 | | 3/2005 | Moore | |
| 7,098,152 | B2 | | 8/2006 | Moore | |
| 7,232,770 | B2 | | 6/2007 | Moore et al. | |
| 2007/0155129 | A1 | | 7/2007 | Thallner | |
| 2007/0185310 | A1 | | 8/2007 | Moore et al. | |
| 2008/0008838 | A1 | | 1/2008 | Arpac et al. | |
| 2009/0017248 | A1 | | 1/2009 | Larson et al. | |
| 2009/0017323 | A1 | | 1/2009 | Webb et al. | |
| 2010/0323573 | A1 | | 12/2010 | Chu et al. | |

FOREIGN PATENT DOCUMENTS

JP 2008-038141 A * 2/2008
WO WO 2008/008931 A1 1/2008

OTHER PUBLICATIONS

Machine raw translation of JP 2008-038141A.*
Mould, D., and Moore, J., "A New Alternative for Temporary Wafer Mounting," GaAs ManTech Conf. and Proc., (p. 109-112), 2002.
Moore, J., Smith, A., and Kulkarni, S., "High Temperature Resistant Adhesive for Wafer Thinning and Backside Processing," GaAs ManTech Conf. and Proc., (p. 175-182), 2004.
E. J. Powers and G. A. Serad, "History and Development of Polybenzimidazoles," Symposium on the History of High Performance Polymers, American Chemical Society, New York City, Apr. 15-18, 1986.

* cited by examiner

*Primary Examiner* — Ana Woodward
(74) *Attorney, Agent, or Firm* — Hammer & Associates, P.C.

(57) ABSTRACT

PBI compositions include solutions comprising PBI and acrylate monomer and coatings comprising PBI and polyacrylate. The solutions may also include polymerization initiator, solvent, co-polymers. The coatings are thermally resistant, electrically insulating (dielectric), and adhesive. The PBI compositions are used in the manufacture of microelectronics and related products. Methods for applying the PBI compositions are also discussed.

21 Claims, 4 Drawing Sheets

POLYBENZIMIDAZOLE/POLYACRYLATE MIXTURES

RELATED APPLICATION

This application claims the benefit of U.S. Provisional Application Ser. No. 61/265,452 filed Dec. 1, 2009.

FIELD OF THE INVENTION

Polybenzimidazole (PBI) compositions comprising PBI polymer and acrylate monomers are disclosed. The PBI compositions may be used as, among other things, solutions, or thermally resistant and electrically insulating (dielectric) coatings and adhesives in the manufacture of microelectronics and related products.

BACKGROUND OF THE INVENTION

Polymer coatings are used widely in many markets to provide work functions varying from substrate protection, adhesion onto a range of materials, patterning, and electrical isolation. In demanding applications, polymers are subjected to harsh conditions and are required to meet specific engineering properties.

An area of significant growth in back-end semiconductor processes involving chip connectivity and which require significant amounts of polymer is in the deposition of dielectric coatings. During the manufacture of electronic devices, the metallic routing is well defined and must perform at high conductivity with a low risk of electrical leakage or shorting. These metallic lines and junctions are bordered by insulators of a polymeric variety. These polymers must be deposited with a high degree of uniformity and in some cases, must be thick, typically greater than 5 µm (micron). Further, these dielectric coatings are commonly subject to high temperatures and a wide range of environmental conditions. It is desired to coat substrates with polymer films, which meet these requirements of smoothness, thickness, thermal resistance, and environmental protection.

Typical organic-based dielectrics are chosen from engineering polymers, as these materials comprise high molecular weight substances, offer insulative properties, and resist temperatures and other damaging effects to the microelectronic circuit. Examples of these chemistries include polyimide (PI) and poly-(p-phenylene-2,6-benzobisoxazole) (PBO) as manufactured by Hitachi-DuPont Microsystems (www.hdmicrosystems.com). Another popular organic insulator for electronic applications is bisbenzocyclobutene (BCB), manufactured by the Dow Chemical Company (www.dow-.com/cyclotene). Another product that is of a different chemistry, yet is structurally rigid and exhibits resistance character that is common to these families is a photoimageable epoxy, using InterVia™, manufactured by Rohm and Haas (www.rohmhaas.com).

These polymers are applied to the substrate in a similar fashion as a photoresist, using conventional spin and spray coating methods, or they may be slit-coated as is common practice in manufacturing flat panel displays (FPDs). By far, the most common coating method is spin coating. For this reason, the organic-based dielectrics described here may often be referred to as spin-on dielectrics.

In microelectronic manufacturing, spin coating is the method of choice used to apply a thin polymer coating to a substrate. Material is dispensed in the form of a liquid at the center of a substrate and then the coating equipment applies a high rate of circular motion. Liquid delivery may be done by a static method, whereby the fluid will "puddle" onto the surface. A dynamic method may also be used where the material is dispensed when the substrate is already in motion. The substrate spins at a known rotation per minute (rpm), which spreads the polymer fluid over the substrate. As the polymer fluid spreads over the surface, it undergoes dynamic changes in rheology due to solvent evaporation, leading to viscosity increase, and fixing of the polymer onto the surface as a thin coating. The polymer fluid is driven from the center to the edge of the substrate by centrifugal force from the applied motion.

Surface tension describes the nature of substrate wetting, a major contributor to good film formation. A liquid is said to wet a substrate when the substrate has equal or higher surface tension than the liquid itself. Surface tension is the force that holds a liquid together and causes it to occupy the smallest possible volume. This is why atomized liquids, or any which are suspended, will form a bead.

In terms of fluid dynamics, spin coating can be described as the interaction of two bodies, a solid body that is rotating underneath a liquid body. The friction of the rotating body causes dramatic movement outward from the center to the edge by centrifugal force. The liquid continues movement outward until the viscous adhesion of the fluid equals the frictional force of the moving substrate. Viscous adhesion will increase as the resin fluid undergoes evaporation and viscosity increases. With viscosity increase, frictional forces increase with the underlying moving substrate, and the film begins to fix onto the surface. At this point, the frictional forces in the fluid dominate which leads to limited mobility and further condensation. Continued rotational motion leads to further evaporation and densification, the dominant fluid dynamic of the last stage of coating.

As the polymer coats the surface and is driven to the edge, it will eventually be "spun-off" of the substrate and much of the material will collect in the "spin bowl" of the equipment, where it then drains to a waste receptacle. Film thickness, micro- and macro-uniformity, and adhesion will depend on the nature of the resin and the resin mixture (percent solids, viscosity, solvent vapor pressure, etc.) and the parameters chosen for the coating process. A common practice to achieve thick coatings is to increase the percent resin in a coating composition, which invariably increases the viscosity of the coating composition. However, such viscosity increase may result in poor coating performance. In total, the coating process may be viewed as governed by physical-chemical dynamics of wetting, mobility, viscosity, and evaporation.

The manipulation of spin-speed is a common focus of many apparatus used in the microelectronics industry. Substrate rotation will have a direct affect on these properties and produce different coating results. At low spin-speeds, fluid mobility will be low with minor material loss and consequently, coating, fixing, and densification is accelerated, resulting in thicker films, typically measured in microns (1 um=$1\times10^{-6}$ m). However, high spin-speeds will result in high fluid mobility, high material loss, and low fixing and evaporation. High spin-speeds result in thin films, typically measured in angstroms (1 Å=$1\times10^{-10}$ m).

Once the dielectric is applied, it may undergo a patterning process. Patterning may include in-situ exposure of the dielectric due to the presence of photosensitive components, or a secondary coating, which typically comprises a photosensitive material such as photoresist. Once the initial coating is complete and where necessary, patterned, it must be cured to a final-stage, which permanently fixes the material in place to reach the desired chemical and physical properties for performance of the electric circuit. For purposes of this discussion, reference to the organic-based dielectrics includes PI, PBO, BCB, and epoxy. Final curing of these materials typically includes an exposure to high temperature for periods of time. This curing allows for a chemical condensation reaction to occur where high density polymeric cross-linking takes place. In the case of PI, an imidization process produces the high molecular weight of the final species. Process temperature exposures are common at 200° C., and many times, will require up to 300° C., depending upon the holding time. Interdependence exists between temperature and time, whereby it is common to have lower temperature exposures at 200° C. but require an excess of 3 hrs baking time.

The number of metals and substrates used in microelectronics vary, and for this reason, additional handling practices must be instituted to minimize cracking, loss in adhesion, or other failures. These added practices include reducing temperature shock by extending the process time for heating and cooling, allowing for differences in material coefficients of thermal expansion. The high temperature bake at an extended time represents a process challenge in microelectronic manufacturing.

Once a dielectric coating that comprises PI, PBO, BCB, or epoxy is fully cured, it is considered to be permanent, whereby, the need for rework would either require the use of aggressive materials such as strong acids or bases, or mechanical removal. Such aggressive methods would likely attack and/or destroy the substrate or adjacent metals. More practically, once these systems are final cured, a rework condition would be considered as not commercially available.

It is therefore desirable to have a polymer coating, which exhibits fundamental thermal resistance as its property and is able to support the application of smooth and thick coatings that are cured at lower temperatures following a rapid process; once cured, the coating is preferred to support simple rework practices.

Another area in microelectronic manufacturing where thick polymer films, which exhibit thermal resistance are needed, is the practice of wafer thinning. Substrate thinning is a standard practice in the fabrication of microelectronic devices. A thinned substrate is used to enhance cooling of the device during its operation as a chip in a computer, cell phone, or other end use electronic component such as an appliance. Another purpose of thinning is to enable thin substrate stacking, for example, as in three dimensional (3-D) packaging (i.e. chip stacking), and to reduce the mass of the final product. The requirement of thermal resistance is needed to support backside processing of the thinned substrate. The backside processing practices of thermal resistance include the etching of through silicon vias (TSV) or deposition of silicon oxide, whereby temperatures during chemically assisted plasma or evaporative deposit processing may exceed 300° C. TSV and related backside steps allow connectivity between stacked chips.

In IC manufacturing, there is a continued demand to miniaturize devices while a growing desire also exists to stack chips (i.e. 3-D packaging). Achieving these objectives is limited by the ability to reduce the substrate to ultra-thin dimensions. To fully appreciate this need, it is necessary to consider the common and generally accepted phenomena that most, if not all ICs, generate heat as a byproduct of their function and will perform less than ideally with such heat exposure. In a conventional IC, only a minor proportion of the substrate is used for its performance. Since semiconductors are poor thermal conductors, they will store the generated heat in their mass. As more heat is produced, more is stored, until a physical limit is reached in the electrical circuit at which efficiencies drop and errors occur. To maintain proper IC function, heat must be continually removed as it is generated.

The common method for IC cooling (i.e. heat removal) is to install blowers, which dissipate heat from the printed wire board (PWB). For miniaturized ICs, this means of removing heat is impractical. Hand-held devices such as calculators, cell phones, pagers, and others must depend upon dissipation of heat through conduction. For best results, the IC substrate is thinned and brought into direct contact with a heat conducting medium, e.g. heat sink. As the IC's heat is generated, it is conducted away (dissipated) by intimate contact with a comparatively large heat sink.

Not only does wafer thinning help to dissipate heat, but it also aids in the electrical operation of the IC. Substrate thickness affects impedance and capacitance performance of certain connecting leads, e.g. transmission lines, of given thickness from the top of the IC to the bottom where contact is made to the PWB. Thick substrates cause an increase in capacitance, requiring thicker transmission lines, and in turn, a larger IC footprint. Substrate thinning increases impedance while capacitance decreases, causing a reduction in transmission line thickness, and in turn, a reduction in IC size. In other words, substrate thinning facilitates IC performance and miniaturization.

An additional incentive in support of substrate thinning involves geometric reasons. Via-holes are etched into the backside of an IC device wafer to facilitate front side contacts. In order to construct a via-hole (hereafter sometimes referred to as a "via" or "vias") using common dry-etch techniques, minimum geometrical design standards apply. Namely, for IC substrates of the gallium arsenide (GaAs) type with thicknesses of <100 µm, a 30-70 µm diameter via may be constructed using dry-etch methods that produce minimal post-etch residue within an acceptable time. In silicon substrates of thicknesses of <25 µm, vias of much smaller diameter of <10 µm, sometimes referred to as through silicon vias (TSVs), are used for communication between stacked chips in 3-D packaging. Due to the complexity of silicon ICs, many TSVs are required for connectivity. As substrates are thinned further to smaller dimensions, smaller diameter vias may be used, requiring shorter etch times, producing smaller amounts of post-etch residue, and promoting greater throughput. Smaller vias require less metallization and in turn, lower cost. Therefore, from the standpoint of backside processing, thin substrates are processed quicker and at lower cost.

A final consideration in support of thin substrates is that they are more easily cut and scribed into devices. Thinner substrates have a smaller amount of material to penetrate and cut, and therefore require less effort. Whether the method used is sawing, scribe and break, or laser ablation, microelectronic devices are easier to cut from thinner substrates.

Examples of final products in microelectronics where there exists a desire to thin substrates includes integrated circuits (IC), microelectromechanical systems (MEMS), and large irregular panel dimensions as in flat panel displays (FPD) and solar substrates. Manufacturing ICs and MEMS are typically conducted upon wafers of standard diameters that are composed of silicon or a compound semiconductor species and are taken to ultra-thin values (i.e. <20 µm) and subsequently stacked to achieve designs in 3-D packaging. Where FPDs and solar panels are concerned, thinned substrates of various shapes are required to reduce weight to meet ergonomic objectives of the final customer package. Conventional technologies for achieving thin device substrates include mechanical grinding and chemical etching, and where ultra-thin dimensions are in demand, various protecting and handling materials are used, including tapes, coatings, and externally mounted rigid supports (i.e. carriers).

Wafer thinning to dimensions of <50 μm substrate thickness, although being a common practice in the manufacture of high power chips of the variety of compound semiconductor designed for radio-frequency emittance (e.g. cell phones, radar, etc.), has not been in high volume production, rather, it is done in limited numbers for special applications. With the need for thin silicon emerging, high volume wafer thinning down to ultra-thin levels is now a commercial target. Wafer thinning requires complete planarization of the wafer topography, with device geometries exceeding 10 μm (microns). It is desired to have a method of coating thick polymers onto this surface, which leads to planarization and wafer thinning support.

As with any new technology, there is always a question of scaling. Within the practice of wafer thinning, discussion surrounds the need to reduce the thickness of the chip to a level that approaches the operating topography of the device. Customary wafer thicknesses during front-end device manufacture begin in the range of 600-700 μm. In many cases, thinning objects must take this dimension to below 20 μm (microns). When this occurs, preparation for handing thin substrates must be included.

In the case where a microelectronic device is manufactured on a wafer, the substrates are thinned after wafer front side operations are complete. In this case, the devices are fabricated onto wafers that exist at their normal full-size thickness, e.g. 600-700 μm (0.024-0.028"). Once completed, they are thinned to 100-150 μm (0.004-0.006"). In some cases, as in hybrid substrates used for high power devices, e.g. Gallium Arsenide (GaAs), thickness may be taken down to <20 μm (<0.001").

Substrate thinning may be performed by mechanical or chemical means. In a mechanical thinning process, the substrate surface to be thinned is brought into contact with a hard and flat rotating horizontal platter, which may or may not contain liquid slurry. The equipment may be referred to as a "grinder" or a "coarse polisher". When slurry is used, it may contain abrasive media with chemical etchants such as ammonia, fluoride, or the combinations thereof. The abrasive operates as a "coarse" substrate removal practice, to thin the substrate, while the etchant chemistry facilitates "polishing" at the submicron level.

Thinning may also be performed by chemical etching. Unlike mechanical processing, substrates enter a tank containing a chemical etchant. Substrates are thinned by the action of a vigorous chemical reaction with the substrate composition. For example, silicon may be etched at rapid rates using a mixture of nitric acid with levels of fluoride present, or by the use of a strong alkali such as potassium hydroxide. Chemical etch rates are typically more difficult to control due to their high rates of removal, which may approach 100 μm per minute. Where bath control is needed to achieve greater uniformity, a diluted chemistry with temperature controls is common practice.

In either cases of mechanical and chemical thinning, the substrate is maintained in contact with the media until an amount of material has been removed to achieve a targeted thickness. For a final thickness of 100 μm or greater, the substrate is held directly with tooling that utilizes a vacuum chuck or some means of mechanical attachment. While it is of interest to achieve substrate thinning, it is simultaneously an objective to protect the device areas during such processing. Protection of the device area may occur by a sealed vacuum chuck, an adhesive film (i.e. tape), or a polymer coating. Once the process is completed, the film or coating must be removed.

Conventional methods to achieve thinning are limited by the ability to handle fragile substrates, and when pursuing the very thin, there is a requirement to use external support structures. Where economic limitations exist, external supports are not used, whereby the choice in final thickness is then dependent upon the ability to handle thin substrates in a tool. However, for achieving thin substrates (i.e. <100 μm), it becomes difficult or impossible to maintain control, e.g. attachment and handling, by making such contact directly to the substrate. In some cases, mechanical devices may be made to attach and hold onto thinned device substrates, however, they are subject to many problems, especially when processes vary. For these reasons, the substrates may be temporarily mounted onto separate rigid supports (carriers). The external temporary support (i.e. carrier) is mounted to the wafer to allow ease of handling during thinning and backside processing. These temporary mounted carriers become the holding platform to allow a tool to grab and secure the device substrate to support thinning, resist patterning, plasma etching, post-etch residue cleans, and metallization.

Temporary mounted carriers may include sapphire, quartz, certain glasses, and silicon. They usually exhibit a thickness of 1000 μm (1 mm or 0.040"). Substrate choice will depend on how closely matched the coefficient of thermal expansion (CLTE) is between each material. Although it is common to use transparent carriers such as sapphire, quartz, and glass, some cost sensitive processes may use silicon with an alternative practice to the use of visible light microscopy for locating alignment markers or conducting inspection. Where necessary, carrier substrates may be produced with holes, channels (e.g. grooves), or other similar designs. These specially designed carriers offer an enhanced transport of chemical fluids to the surface of the substrate in order to accelerate demount.

All external carriers require the use of an adhesive for mounting onto the device substrate. The adhesive becomes incorporated into the substrate-carrier package, whereby its properties must exhibit thermal resistance to be accepted into the steps of thinning and backside processing.

Mounting of the external carrier to the semiconductor wafer can be a lengthy and a delicate process. During mounting, the device substrate and potentially the external carrier is coated with the adhesive, brought into direct contact with each other, and cured to a level sufficient to secure both surfaces. Attention must be given to the adhesive's ability to planarize the device surface such that the topography is fully encapsulated and protected within the wafer-carrier package. During mounting, excessive pressures may be applied. A special tool may be used, commercial devices are classed as bonding equipment (e.g. bonders). Depending upon the adhesive, the mounting process may utilize heat, light exposure, pressure, or any variety of these together, to achieve cure and facilitate a securely mounted substrate and carrier. The adhesive must maintain a rigid network such that no mechanical compromise occurs (e.g. movement) and any reference points required during mounting are identified and preserved. The maximum temperature exposed to the substrate-carrier package occurs in wafer backside processing during resist baking, via etching, and the deposition of certain metals or oxides.

Demount (i.e. debonding) is the reverse process, involving the separation of the external carrier from the device substrate by a means of chemical, mechanical, or processes that involve the combination thereof. Chemical demounting requires the use of perforated support substrates, specially fabricated to increase the rate of chemical penetration leading to dissolution and removal of the mounting adhesive. In this process, the chemistry of choice is an organic solvent that is heated and allowed to diffuse into the holes (perforations) or channels (grooves), as well as the bond line between the external carrier and device substrate. The organic solvent will swell and dissolve the temporary adhesive to such a level which effects demounting of the external carrier, as well as the removal of residual adhesive on the device substrate surface. These chemicals are needed in quantities necessary to support a cleaning process, whereby the substrates travel from one heated bath to another in an effort to demount the external carrier and remove the adhesive to deminimus levels on the device substrate and result in a clean surface. The entire demount may be measured in terms of 30 minutes to several hours, depending upon the use of heat and agitation.

Alternatively, thermo mechanical demounting may be achieved with thermoplastic adhesives. As taught in U.S. Pat. No. 6,792,991 B2, Thallner, and U.S. Patent Application No. 2007/0155129 (2007), Thallner, separation may be achieved by heating the wafer-carrier package to a temperature above the melting point of the adhesive while simultaneously applying a shear force in a manner designed to separate the mounted surfaces. In other words, the device substrate is removed from the external support carrier by heat and a mechanical force of a predetermined amount and in an orientation sufficient to slide the two surfaces in a shear direction. Cleaning with a selected organic solvent typically follows to ensure residual adhesive is cleaned from the substrate.

Mechanical separation is observed to be faster than a chemical demount process. However, specially designed tools must be used to mechanically remove a thinned device substrate from the external carrier without damage to the topography. Although mechanical removal may proceed faster than chemical, a true comparison should consider total throughput. For example, a chemical demount process is typically done by a batch process where two or more cassettes of twenty-five (25) wafers each are accommodated in a bath. A mechanical tool designed for shear separation (i.e. slide function) typically operates as a single wafer operation. Process time of a batch chemical diffusion driven demount which use perforated carriers could take up to 3 hrs, however, there may be 50 wafers at a time in the bath. Therefore, for a process time of anywhere between 2-4 min for a single wafer process, the overall throughput is comparable to a batch driven process that takes 3 hrs. Further, there is an increased risk in substrate damage when using a mechanical device that moves or pulls the microelectronic substrate against the surface of the external support carrier. Where there may be an interest to consider mechanical equipment, the adoption must meet the requirements and cost constraints of the process.

Another desire of the adhesive is to exhibit good chemical resistance to diluted aqueous chemistries of various characteristics. This must be established for a range of chemistries from strong etchants used in post-thinning stress relief such as sulfuric, ammonia, and/or peroxide, as well as organic solvents used in the lithography and clean steps during via-hole processing. Ideally, the adhesive must be resistant to these process chemistries, yet be selectively dissolved and removed at the end of the manufacturing process line. At times, certain aggressive chemistries may be chosen which have detrimental effects on the adhesive. As such, some temporary manufacturing measures may be taken to include protective tape or other coverings.

A review of the adhesive properties used to support device substrate thinning and backside engineering processes in microelectronic manufacturing presents serious and compelling challenges. In U.S. Pat. No. 7,098,152 (2006), Moore, teaches a process of using an external temporary carrier with an adhesive coating which is based upon mixtures of rosins and urethanes. Further description of this rosin-urethane chemistry and its application to wafer thinning are disclosed in U.S. Pat. No. 6,869,894 (2005), Moore, and in Mould, D., and Moore, J., *A New Alternative for Temporary Wafer Mounting*, GaAs ManTech Conf. and Proc., pp. 109-112, (2002). The compositions and practices identified in these references provide the necessary conditions as an adhesive coating that is thermally resistant up to and including 130 degrees centigrade (130° C.).

Mounting adhesives based upon the use of silicone rubber compounds and used in the manner to apply external temporary carriers to silicon and compound semiconductor wafers are disclosed in U.S. Pat. No. 7,232,770 (2007), Moore et al., and the publication by Moore, J., Smith, A., and Kulkami, S., *High Temperature Resistant Adhesive for Wafer Thinning and Backside Processing*, GaAs ManTech Conf. and Proc., pp. 175-182, (2004). These documents describe the use of a high temperature resistant adhesive based upon silicone compounds, which may be processed at temperatures exceeding 200 degrees centigrade (200° C.).

Another adhesive composition disclosed in U.S. Patent Application No. 2007/0185310 A1 (2007), Moore et al., where thermal and chemical resistant coatings are taught based upon the use of ethylene propylene diene monomer (EPDM) and related hydrocarbon rubber compounds. These documents describe a process for adhering external temporary carriers to semiconductor wafers, and once cured, are observed to withstand processing temperatures that exceed 200 degrees centigrade (200° C.) and are resistant to polar solvents commonly used in semiconductor fabrication areas, such as n-methyl pyrollidone (NMP).

Another adhesive system for substrate thinning which uses external carrier supports, is described in the U.S. Patent Applications 2009/0017248 A1 (2009), Larson et al., 2009/0017323 A1 (2009), Webb et al., and in the International Application WO 2008/008931 A1 (2008), Webb et al. These documents describe the use of a layered body that is formed which comprises the substrate being attached to an external carrier support. The adhesive described is a bilayer system composed of a photothermal conversion layer and a curable acrylate. Typical acrylic chemistries are not categorically considered to be engineering polymers, and therefore, do not exhibit the quality of thermal resistance. In review of the U.S. Patent applications 2009/0017248 A1 (2009), 2009/0017323 A1 (2009), and in the International Application WO 2008/008931 A1 (2008), the value of thermal resistance for the layered body is not mentioned. Nevertheless, those who are skilled in the art would generally accept a maximum thermal resistance range for unfilled acrylic polymers to be <200° C. for process durations sufficient to support wafer thinning applications. We emphasize "unfilled", as it is not mentioned in the U.S. Patent applications 2009/0017248 A1 (2009), 2009/0017323 A1 (2009), and in the International Application WO 2008/008931 A1 (2008), that the acrylic systems in practice use engineering fillers.

The aforementioned polymer compositions as described here in U.S. Pat. No. 6,869,894 (2005), Moore, U.S. Pat. No. 7,232,770 (2007), Moore et al., U.S. Patent Application No. 2007/0185310 A1 (2007), Moore et al., and the combined descriptions of U.S. Patent Applications 2009/0017248 A1 (2009), Larson et al., 2009/0017323 A1 (2009), Webb et al., and in the International Application WO 2008/008931 A1 (2008), Webb et al., all describe traditional methods of attaching an external carrier support made of glass, sapphire, or silicon to a wafer using adhesive chemistries: a thermoplastic rosin-urethane, a thermoset silicone, a thermoplastic rubber, and a thermoset acrylic, respectively. The thermal resistance as reported in these documents or otherwise investigated does not significantly exist above the value of 200° C.

It is therefore desirable to have a polymer coating, which exhibits the fundamental property of thermal resistance that significantly exceeds 200° C., preferable to beyond 300° C., and is able to perform as a temporary adhesive to mount semiconductor wafers to external carrier substrates, support the application of wafer thinning and backside processing, and finally, to demount and clean with simple chemistries at acceptable process conditions.

The engineering polymer, polybenzimidazole (PBI), provides key engineering properties such as a high temperature resistance, indicated by a high glass transition (Tg>435 degrees centigrade), and low coefficient of thermal expansion (CTE<23 ppm). Other noteworthy properties and uses for PBI include protective films as presented in the report, "*History and Development of Polybenzimidazoles*," authored by E. J. Powers and G. A. Serad, presented at the Symposium on the History of High Performance Polymers, American Chemical Society, New York, Apr. 15-18, 1986. The use of PBI as a coating has been limited by poor stability as a pure organic solution (i.e. PBI dissolved in organic solvents) and poor adhesion to hard substrates when it is coated and cured. See for example U.S. Pat. No. 5,549,946 (1996), Iura, et al., and U.S. Pat. No. 5,674,614 (1997), Onishi, et al.

While there is a desire to address the need for a high temperature resistant form of PBI which exhibits sufficient stability without the use of metallic stabilizers and will perform as a smooth coating onto microelectronic devices with a rapid cure at moderate temperatures for use as a dielectric, there also, is a challenge to address the need for a thermal resistant adhesive form of PBI to support thinning and backside processing of device substrates of various sizes and shapes. Taking these challenges together, there is a pressing need to provide a consistent and universal product, which uses a composition that comprises PBI and meets the objectives of a thermal resistant coating that is able to coat a range of substrates and thicknesses, and depending upon these application conditions, is sufficient to be classified as a dielectric and/or adhesive for wafer thinning and backside processing.

SUMMARY OF THE INVENTION

PBI compositions include solutions comprising PBI and acrylate monomer, and coatings comprising PBI and polyacrylate. The solutions may also include polymerization initiator, solvent, co-polymers. The coatings are thermally resistant, electrically insulating (dielectric), and adhesive. The PBI compositions are used in the manufacture of microelectronics and related products. Methods for applying the PBI compositions are also discussed.

DESCRIPTION OF THE INVENTION

Figure 1:
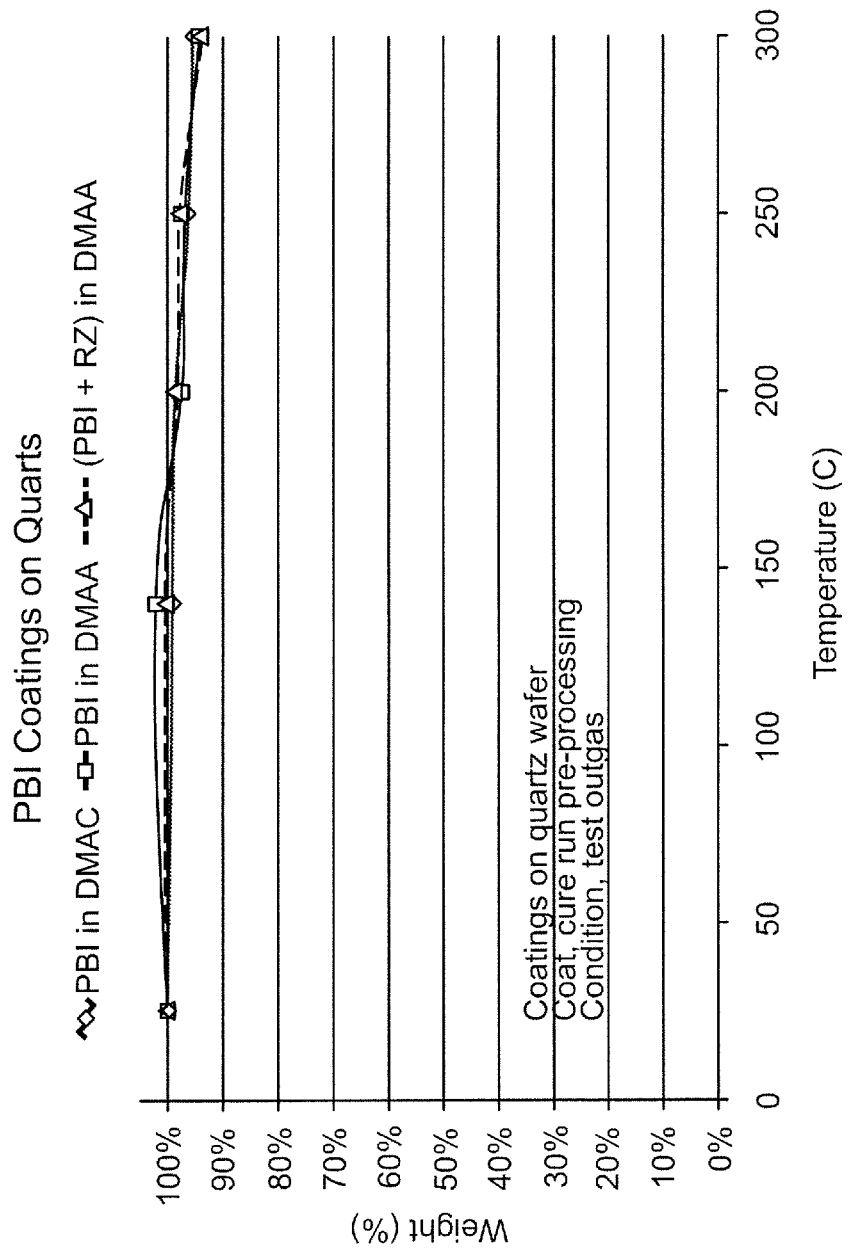
FIG. 1 is a plot of the out gassing by % weight loss of various PBI/Polyacrylate coating (RZ=COPOLYMER Rezicure).

The invention described hereinafter has several aspects which include, but are not limited to: a solution of polybenzimidazole and an acrylate monomer, a coating of polybenzimidazole and polyacrylate, a method of coating a substrate, and various exemplary applications for the coating. Each will be discussed below.

The solution of PBI and acrylate monomer comprises PBI dissolved in an acrylate monomer. Additionally, the solution may include a polymerization initiator. The solution may also include a solvent, a co-polymer, and other additives. The solution is preferably free of any extraneously added water (i.e., anhydrous). The solution may comprise 0.5-40.0 weight % PBI. The solution may comprise 0.5-40.0 weight % PBI and 60-99.5 weight % acrylate monomer. The solution may comprise 0.1-99.0 weight % acrylate monomer. The solution may comprise 5-25% weight PBI and 50-95 weight % acrylate monomer and solvent with the acrylate monomer ranging from 0.1-100% of the acrylate monomer/solvent blend. The solution may have a concentration of PBI in the range of 0.1-20.0 weight %.

Polybenzimidazole (PBI) exhibits high molecular weight (e.g., IV≥0.8 dL/g) and includes structures of a heterocyclic character, or of containing atomic rings made up of more than one kind of atom. One structure of PBI is the 1,3-dinitrogen heterocycle, whereby the polymer repeat unit is benzimidazole. PBI which include dinitrogen heterocycles are represented in the basic structures in items (1) & (2), where —Z— is an arene of mono or poly-nucleus variety having the nitrogen atoms of the benzimidazole ring bond at adjacent locations on the respective arene ring; R is an arene of mono or poly-nucleus variety exhibiting tetravalent character and orienting itself in the ortho direction to bond at adjacent carbon locations on the arene ring with the nitrogen atoms of the benzimidazole rings; and the substituent $R^1$ may comprise an arene ring, an alkylene having 4-8 carbons, or a heterocyclic ring that includes pyridine, pyrazine, furan, quinoline, thophene, and pyran.

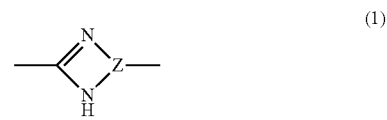

(1)

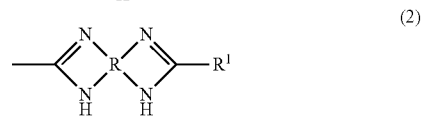

(2)

A particular PBI that is commercially available and most commonly understood to represent the name PBI (polybenzimidazole) in a majority of applications in commerce is poly [2,2'-(m-phenylene)-5,5'-bibenzimidazole], represented in item (3). However, other derivatives of PBIs exist and it is not the intent of this invention to limit the use and application of PBI to any one (single) form of the PBL Rather, this invention applies to a range of polymers classified as PBI, based upon the chemistry and functional groups present on the polymer described in items (1), (2), and (3).

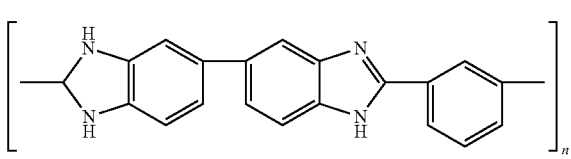

(3)

Additional descriptions of PBI, which may be used in this invention, are among other places, presented in U.S. Pat. No. 3,174,947, Marvel, et. al, where various forms of PBI polymers are detailed with their preparations; and in U.S. Pat. No. 2,895,948, Brinker, et. al, where compounds of PBI are described as linear condensation polymers formed from aromatic tetramines and aromatic dicarboxylic acids prepared at elevated temperature in the absence of oxygen. Both of which are incorporated herein by reference.

Exemplary PBIs include, but are not limited to: poly-2,2'-(m-phenylene)-5,5'-bibenzimidazole, poly-2,2'-(pyridylene-3",5")-5,5'-bibenzimidazole, poly-2,2'-(furylene-2",5")-5,5'-bibenzimidazole, poly-2,2'-(naphthalene-1",6")-5,5'-bibenzimidazole, poly-2,2'-(biphenylene-4",4'")-5,5'-bibenzimidazole, poly-2,2'-amylene-5,5'-bibenzimidazole, poly-2,2'-octamethylene-5,5'-bibenzimidazole, poly-2,6-(m-phenylene)-diimidazobenzene, poly-2,2'-cyclohexenyl-5,5'-bibenzimidazole, poly-2,2'-(m-phenylene)-5,5'-di(benzimidazole)ether, poly-2,2'-(m-phenylene)-5,5'-di(benzimidazole)sulfide, poly-2,2'-(m-phenylene)-5,5'-di(benzimidazole)sulfone, poly-2,2'-(m-phenylene)-5,5'-di(benzimidazole)methane, poly-2',2"-(m-phenylene)-5',5"-di(benzimidazole)propane-2,2, and poly-2,2'-(m-phenylene)-5',5"-di(benzimidazole)ethylene-1,2. The preferred PBI polymer structure is described in FIG. 3, poly-2,2'-(m-phenylene)-5,5'-bibenzimidazole.

Acrylate monomer refers to any acrylate monomer. Acrylate monomers include, but are not limited to, one or more members from the groups consisting of acrylates, methacrylates, acrylamides, methacrylamides, hydroxy acrylates of various alkyl substituent derivatives. Acrylate monomers include those species with the general formula described in item (4), where both $R^2$ and $R^3$ may represent the following: hydrogen (—H), amide (—$NH_2$), methyl (—$CH_3$), hydroxyl (—OH), alcohol (—$CH_2OH$), or any one of the groups represented by the formula —$C_nH_{(2n+1)}$ or —$C_nH_{(2n)}OH$ where n varies from 2-20; aromatic hydrocarbon functional groups of the formula —$C_6X_5$, where X may be substituent groups such as hydrogen (—H), the halogens (—F, —Br, —Cl, —I), hydroxyl (—OH), —COOH; and —$COOR^4$ groups, wherein $R^4$ represents the following: hydrogen (—H), amide (—$NH_2$), methyl (—$CH_3$), hydroxyl (—OH), alcohol (—$CH_2OH$), or any one of the groups represented by the formula —$C_nH_{(2n+1)}$ or —$C_nH_{(2n)}OH$ where n varies from 2-20.

(4)

It is to be understood that the chemistry of the said substituent groups at the positions $R^2$ and $R^3$ should be chosen such that the overall properties of the compound stated in item (4) does not unduly hinder or interfere with the dissolution of the PBI, and, once the PBI is dissolved, the solution's stability.

The preferred acrylic monomers are those represented by item (4), wherein $R^2$ is a hydrogen (—H), or methyl (—$CH_3$), defining the molecule as an acrylate or methacrylate, respectively, and $R^3$ to represent a substituent of the form or —$C_nH_{(2n)}OH$ where n varies from 2-20. Such preferred acrylics include hydroxyethyl acrylate (CAS #818-61-1), hydroxypropyl acrylate (CAS #25584-83-2), hydroxyethyl methacrylate (CAS #868-77-9), and hydroxy propyl methacrylate (CAS #27813-02-1).

The more preferred acrylic monomers are those represented by item (4), wherein $R^2$ is a hydrogen (—H), or methyl (—$CH_3$), and $R^3$ to represent a substituent of the form amide (—$NH_2$), defining the molecule as an acrylamide. Such preferred acrylics include n,n-dimethylacrylamide (DMAA, CAS #2680-03-7). DMAA has been shown to exhibit a significantly higher solubility for PBI polymer over the conventional acrylates or methacrylates.

The solutions of PBI and the acrylate monomer should also include a free radical initiator (i.e., polymerization initiator). Free radical polymerization of acrylate may be initiated by light (photoinitiator) or heat (thermal initiator). Polymerization by heat is preferred. The free radical initiator may range for 5 ppm to 15% by weight, or, in another embodiment, from 0.01-5% by weight.

Any photoinitiator may be used. Photoinitiators with absorbencies below 425 nm and that extend into the ultraviolet range are more preferred. Photoinitiators include benzoin ethers, acetophenones, benzoyl oximes, acylphosphines, and combinations thereof. These initiators may also include phenylglyoxylate, benzyldimethylketal, ∝-aminoketone, ∝-hydroxyketone, monoacyl phosphine (MAPO), bisacylphosphine (BAPO), metallocene, iodonium salt, and combinations thereof. Preferred initiators include 2-hydroxy-2-methyl-1-phenyl-1-propanone (CAS #7473-98-5), 2-phenylacetophenone (CAS #451-40-1), and phosphine oxide phenylbis(2,4,6-trimethylbenzoyl) (CAS #162881-26-7). A commercially available product is Irgacure 2022, as manufactured by CIBA Specialty Chemicals, Basel, Switzerland. Irgacure exhibits absorption maxima at 365 nm, 285 nm, and 240 nm. Concentrations for photoinitiators may be anywhere at ≤5% by weight.

Any thermal initiator (or thermal radical initiator) may be used. Thermal radical initiators (TRI) include, but are not limited to: persulfates, peroxides, azo compounds, acetates, and combinations thereof. Persulfates include inorganic persulfates and organic persulfates. Inorganic persulfates include, but are not limited to, ammonium persulfate (APS), potassium persulfate, and sodium persulfate. Organic persulfates include, but are not limited to, quaternary ammonium persulfates (e.g. tridodecyl ammonium persulfate). Peroxides include, but are not limited to, benzoyl peroxide (BPO), methyl ethyl ketone peroxide, dicumyl peroxide, and benzopinacole (BK), cumene dihydrogen peroxide, and those organic peroxides under the tradename Luperox™ (Arkema, Inc., www.arkema-inc.com). Azo-compounds including, but are not limited to, 2,2'-azobisisobutyrnitrile (AIBN), 4,4-azobis(4-cyanovaleric acid), and 1,1'-azobis(cyclohexanecarbonitrile). Acetates include, but are not limited to, peracetic acid, and tert-butyl peracetate. AIBN is preferred.

The solution of PBI and acrylate monomer may also include a solvent. This solvent is used to facilitate the dissolution of the PBI in the acrylate monomer. Solvents include one or more members from the groups consisting of alcohols, amides, esters, ethers, furans, glycol ether esters, glycol ethers, glycols, ketones, lactates, lactams, pyrroles, or sulfoxides. Dimethylacetamide (DMAC) is preferred.

The solution of PBI and acrylate monomer may also include a co-polymer. These co-polymers are added to aid during coating preparation and to improve engineering properties during processing including adhesion and moisture resistance. The co-polymer may comprise 3-45 weight % of the solution. Co-polymer may include novolacs. Novolacs may be phenol-formaldehyde novolacs, epoxy novolacs, and combinations thereof. The phenol-formaldehyde novolacs may have a melting point from 70-140° C. The epoxy novolacs may have an epoxide equivalent weight (EEW) from 150-220, wherein EEW is determined from the base resin. One phenol-formaldehyde novolac is commercially available under the tradename REZICURE™ from SI Group, Inc. www.sigroup.com. Epoxy novolacs are commercially available under the tradename D.E.N.™ and D.E.R.™ from Dow Chemical Company, www.Dow.com.

The solution may also include other additives that impact the performance of the solution, the coating, and the method of applying the coating. Those additives include, but are not limited to, stabilizing additives, surfactants, and emulsifiers, and combinations thereof. Stabilizing additives include, but are not limited to, an alkali or base of organic or inorganic origin to include ammonium hydroxide, quaternary hydroxides, amines, alkanolamines, elemental hydroxides, or alkoxides, alkyl-sulfonic acids, formic acid, fatty acids, sulfuric acid, nitric acid, or phosphoric acids; complexing agents as benzylic hydroxides such as catechol, triazoles, imidazoles, borates, phosphates, and alkyl or elemental silicates, ethylenediaminetetraacetic acid, diethylenetriaminepentaacetic acid, nitrilotriacetic acid, and 2,4-pentanedione, reducing sugars, hydroquinones, glyoxal, salicylaldehyde, fatty acids such as citric and ascorbic acid, hydroxylamines, or vanillin, and combinations thereof. Surfactants exhibit excellent properties of emulsification for simple hydrophobic/hydrophilic mixtures, however, many also provide the ability to combine in an ionic manner with metals and other charged species. The surfactants aid in the manufacturing and filtration of the invention by maintaining low surface tension to keep all contact surfaces wetted for maximum desired processing. The same phenomenon applies during substrate coating, where the topography is wetted and the device areas are penetrated. The surfactant preferably has a high cloud point (i.e. >60° C.) to allow for compatibility during heated processing and good solubility in polymeric materials. The anionic environment is required for corrosion protection of the substrate's sensitive metals and surfaces. Surfactants may include one or more of the known varieties, including fluorinated systems, nonionic nonyl-phenols and nonyl-ethoxylates, anionic forms that include alkyl-sulfonates, phosphate esters, and succinates. Suitable surfactants include, but are not limited to, anionic phosphoric acid esters, nonionic nonyl phenol ethoxylated alcohols, and alkylbenzene sulfonates, and combinations thereof. Alternative surfactants include polyethylene glycol phenyl ether phosphate under the trade name, Rhodafac™ RP-710, manufactured by Rhodia S. A., Paris, France; and a proprietary phosphate ester under the trade name, Zelec™ UN, manufactured by Stepan Company, Chicago, Ill. Less than about 4% by weight of the anionic surfactant is sufficient. Emulsifiers in an amount effective to maintain solubility and efficacy of the polymer blend as well as to maintain suspension of any microscopic artifacts is employed. The amount of the other additives may range from 100 parts-per-million (ppm) to 5 wt %.

Solution of PBI and acrylate monomer may include more than PBI and more than one acrylate monomer. For example, combinations of various acrylate monomers (e.g., acrylate, methacrylate, and acrylamide) can be used to influence the hardness or adhesion of the coating. If the acrylate combination includes acrylates or methacrylates and acrylamides, then the combination should be rich (on a weight basis) in acrylamide to provide acceptable PBI solubility. For example, one such combination may include 50-80% weight acrylamide. Exemplary acrylates to be mixed with acrylamide monomers include hydroxyethyl acrylate, hydroxypropyl acrylate, hydroxyethyl methacrylate, and hydroxy propyl methacrylate.

While not wishing to be bound to any specific theory, it is believed that the properties of the coating will depend upon the concentration of the PBI, solvent concentration, and type of acrylic monomer. Due to the limited vinyl character present in PBI, curing of the acrylic is additive, whereas the PBI is believed to simply condense within the acrylic matrix. The mechanical nature of the final product is influenced largely by the major species present, namely the acrylic system. To this end, it is assumed that not all acrylics will operate the same; some will provide flexible coatings while others will cure to be rigid and hard.

Although acrylates and their corresponding methylacrylates vary from each other only by a methyl group attached to the vinyl carbon, the two systems are very different in their final properties. Considering polymer systems with pure acrylic, monomers of the acrylate variety are typically soft and may be opaque while their corresponding methacrylates are clear (transparent) and hard. The methyl group acts to hinder movement in the final form polymer, making it hard and less mobile. These differences are explained by the ability of the respective long chains to move or slip against each other in an acrylate system; however, they are obstructed by the methyl group extension in methacrylates. The inhibition in movement results in an increase in the polymer's hardness.

Although free-radical polymerization suggests a linear product, a high probability exists for combination and disproportionation leading to cross-linking between the chains. This is likely to occur when two or more monomers, which have vinyl character, exist in the mix (i.e. methyl methacrylate, styrene, etc.). In this case, homopolymerization and copolymerization occurs linearly, while cross-linking between the chains exists at hindered locations where bulky side groups are present. Crosslinking enhances condensation to a dense and less soluble product. Formulating with different monomers can produce a material with unique properties of hardness, thermal and chemical resistance, and adhesion.

Of particular interest to this invention are the internal properties of the cured product to form a coating or act as an adhesive, both exhibiting properties of thermal resistance. It is known that cross-linking reactions by free-radical curing have the potential to exhibit dramatic condensation as the monomers contact and bond to each other. Many times, this presents a final coating that has shrunk in shape (i.e. reduced size). The shrinking process will also invariably produce a structure under stress. Producing a coating with low stress is a key objective as internal stress will be transferred to the microelectronic substrate and raise the risk of irregularities during its performance.

It is known that a property in polymers known as the glass transition (i.e. Tg) represents the temperature at which the exhibited properties of that material change from a crystalline to an amorphous nature. Operating above the Tg, those materials would be expected to be classified as amorphous and provide greater flexibility, movement, and potentially lower stress. Therefore, materials with Tg values in the low range are expected to exhibit reduced stress. This does not mean that materials with low Tg (i.e. Tg<0° C.). will have poor thermal resistance. On the contrary, many silicone resins exhibit Tg values <0° C. and also exhibit thermal resistance >200° C. Therefore, it is the intent of this invention to combine the benefits of lower Tg value acrylics as the carrier liquid with the high Tg value PBI polymer. The PBI polymer exhibiting an IV of 0.8 has a Tg=427° C., and depending upon choice, acrylic monomers have Tg values <100° C.

When comparing acrylates with methacrylates, the Tg values are observed to be lower in the former vs. the latter. Preferred acrylic systems in this invention include acrylates over that of the methacrylates. More specifically, preferred systems are composed of higher concentrations of hydroxyethyl acrylate, (Tg=−7° C.) and hydroxypropyl acrylate (Tg=−15° C.), vs. hydroxyethyl methacrylate (Tg=+55° C.), hydroxy propyl methacrylate (Tg=+73° C.). The choice in acrylates over methacrylates are provided in mixtures with the preferred acrylamide, n,n-dimethylacrylamide (DMAA, Tg=+119° C.). Mixtures of low Tg acrylates with DMAA will reduce the Tg to a level sufficient to provide coatings of low stress, which satisfactorily meet the requirements of a dielectric coating for microelectronics applications or an adhesive for supporting a thinned wafer onto a carrier substrate.

The coating comprises PBI and polyacrylate. The coating may also include the residual solvent, residual polymerization initiator, and the other additives mentioned above. The coating may comprise 0.5-40.0 weight % PBI. The coating may comprise 0.5-40.0 weight % PBI and the balance polyacrylate. The coating may comprise 5-25 weight % PBI and the balance polyacrylate. The coating may comprise 0.5-40.0 weight % PBI and the balance polyacrylate, residual solvent, residual polymerization initiator, and the other additives. The coating may comprise 5-25 weight % PBI and the balance polyacrylate, residual solvent, residual polymerization initiator, and the other additives.

The coating may be adhered to any substrate. Substrates include, but are not limited to, silicon, gallium arsenide and indium phosphide and sapphire, as well as glass, ceramic, and metallic surfaces (e.g., copper coated substrate).

To facilitate adherence of the coating to the substrate, a primer may be used. The primer may be any primer that increase the adherence of the coating for the substrate. The primer may be novolacs. The primer may be a mixture of the novolacs and amines. The ratio of novolacs:amines may be in the range of 20-5:1, preferably 15-5:1, or 12-8:1. The primer is then dissolved in a casting solvent with a total solides in the range of 3-20% by weight, preferably, 4-10% by weight. Novolacs may be phenol-formaldehyde novolacs, epoxy novolacs, and combinations thereof. The phenol-formaldehyde novolacs may have a melting point from 70-140° C. The epoxy novolacs may have an epoxide equivalent weight (EEW) from 150-220, wherein EEW is determined from the base resin. One phenol-formaldehyde novolac is commercially available under the tradename REZICURE™ from SI Group, Inc. www.sigroup.com. Epoxy novolacs are commercially available under the tradename D.E.N.™ and D.E.R.™ from Dow Chemical Company, www.Dow.com. Amines include, but are not limited to, MDEA (methyldiethanolamine, CAS=105-59-9, BP=247.3C) and MEA (monethanolamine, CAS=141-43-5, BP=171C), and mixtures thereof.

The coating has good thermal resistance properties, dielectric properties, and adhesion performance. The coating can withstand microelectronic manufacturing processes, such as substrate thinning (including high shear grinding and thinning) and subsequent backside applications (including lithographic baking, etching, via-holes through wafers, chemical vapor deposition (CVD) of oxide coating and similar materials (temperatures of up to 300° C. for periods of up to 3 hours). These coating may also make planar surfaces at moderate temperatures and short processing times.

The solution is designed to be applied in many ways, including spin-coating practices as is common to the semiconductor industry, spray, or slit-coating as is common to the manufacturing of large panels. All of these applications involve a liquid polymer system to include the thermal radical initiator at a desired concentration sufficient to achieve the curing reaction. The mixture may be applied directly to the front side of the microelectronic substrate (i.e. the device area). Once applied, the curing process proceeds with a bake condition at sufficient temperatures necessary to complete the cure cycle and promote the outgassing of substances which may interfere with subsequent tasks. Alternatively, the invention coating may be applied to a primer, which sufficiently acts to couple the coating to the substrate, securing the coating as a firmly bound dielectric film or adhesive with demonstrated adhesion that exceeds the demands of the process.

In the case of spin-coating, a silicon wafer is chosen from a variety of diameters. The wafer is staged onto the spin-coating tool, and upon delivery of the liquid support system, the spin tool is initiated. While holding the wafer, a vacuum chuck mechanism begins to spin. As the wafer spins, centrifugal forces are applied to the liquid to force the material to the outer edge, where upon reaching that point, excess material is propelled and it becomes airborne from the wafer edge and impacts the equipment bowl where it is collected and sent to a waste receptacle. At the end of the spin cycle, the wafer is moved to a hot plate. The fluid that remains on the wafer is exposed to heat from the hot plate preset to a desired temperature required for initiating the free radical mechanism. The cured coating is quickly transformed from a liquid to a solid. The surface is smooth over the entire wafer surface with a mirror finish. The variables, which directly affect material thickness, are solution viscosity, volume delivery, and spin speed measured as rotations per minute (rpm). For purposes of achieving a spin-coated film, it is desirable to use liquid systems with a solution viscosity of at least 100 centistokes (cSt) as measured by a kinematic viscometer. When delivering a defined volume to a wafer of a specific diameter and using a spin speed between 250-1000 rpm, the coating thickness may exceed 30 microns (μm), depending upon the concentration of PBI polymer in the mixture. For example, PBI concentrations ranging from 6-20% yield thicknesses in the range of 0.1-40 microns.

A review of the coating uniformity indicates that the film formed is smooth and has a total thickness variation (TTV) on a smooth wafer surface of less than 5%, and most preferably, <1% for a precision of between 1-5 um (microns) over the substrate distance. Low values of TTV suggest a smooth and uniform surface, a necessary characteristic for successful wafer mounting and subsequent operations.

Figure 2:
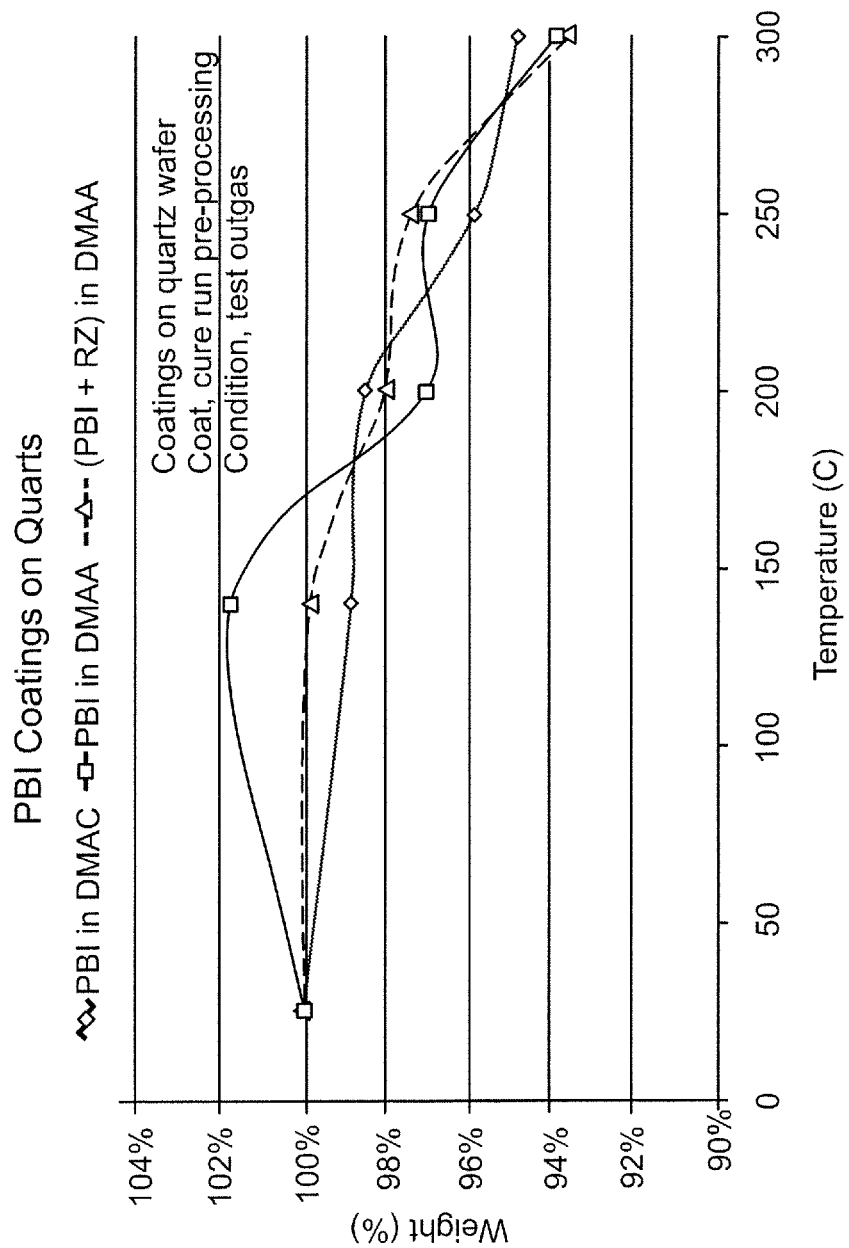
FIG. 2 is a plot of the out gassing by % weight loss of various PBI/Polyacrylate coating (RZ=copolymer Rezicure).

When cured at the recommended conditions, the coating exhibits thermal resistance up to and exceeding 300° C. Measurements by weight loss of wafer coatings have been conducted and observed to produce a maximum change of nearly 6%. This data may also be interpreted as outgas measurement as % weight loss. The data is presented between PBI in solvent (DMAC), PBI in copolymer (DMAA), and PBI in copolymer with solvent (FIGS. 1 & 2). Thermal resistance is measured by thermogravimetric analysis (TGA) to be >350° C. (FIG. 3).

Methods of TGA subject the specimen to temperatures reaching >800° C. as a dynamic ramp or under isothermic conditions. During thermal exposure, the specimen is on a measurement scale that observes small changes in weight.

Figure 3:
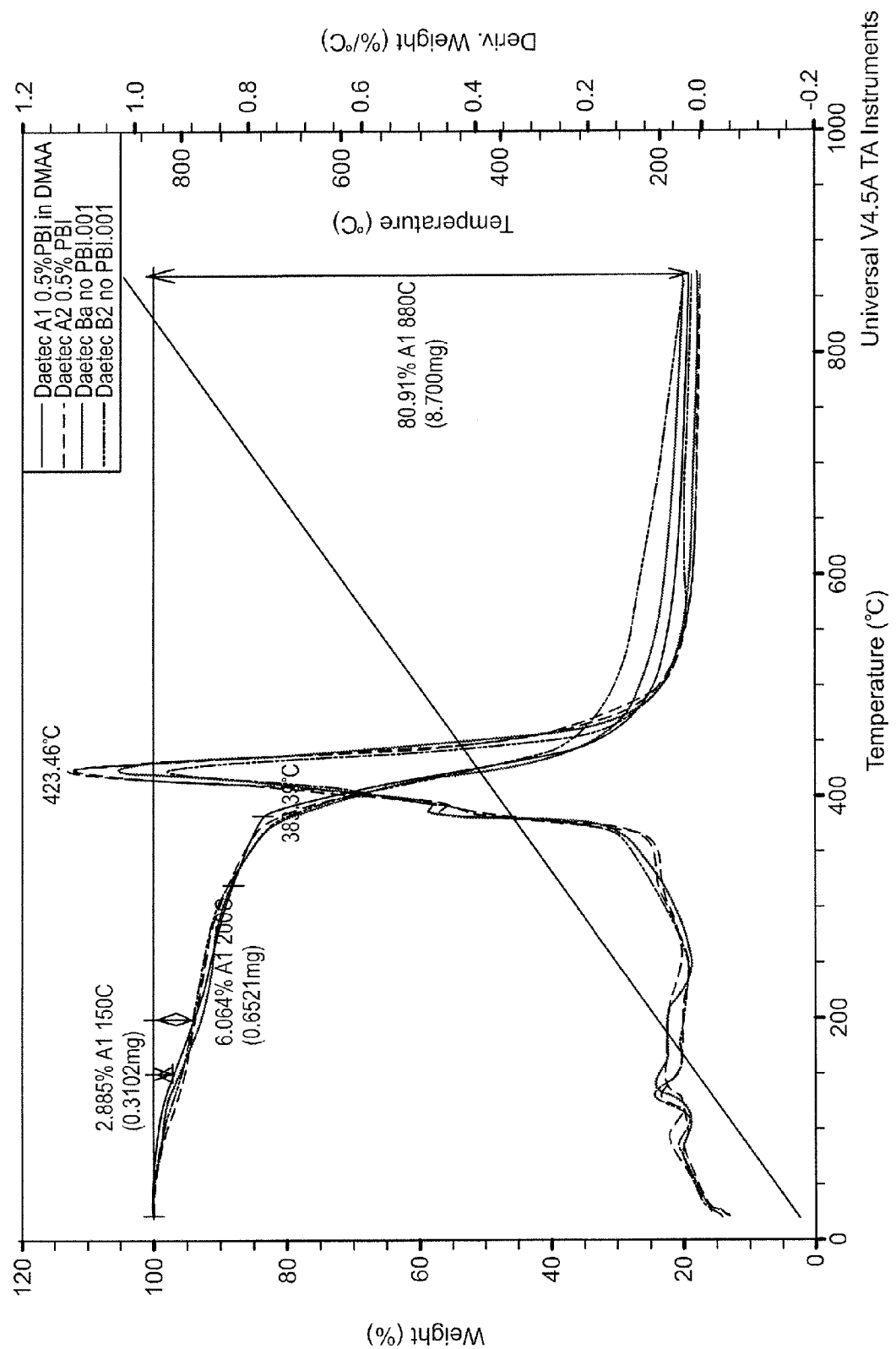
FIG. 3 is a plot of the thermogravimetric analysis (TGA) >350° C. of various PBI/Polyacrylate coatings.

The PBI sample tested with results shown in FIG. 3 suggests a thermal resistance of >350° C. Beyond this temperature (350° C.), further temperature exposure suggests material breakdown. When taking this information and applying in to a process, one may cure the coating and run a thermal pre-treatment to allow specimens to outgas at levels identified as unacceptable for equipment that is sensitive for releases of organic contamination. Low outgassing is preferred for successful RTF processes.

Once the invention has been coated and cured onto a microelectronic substrate, its moisture resistant and adhesive properties may be identified by standard methods available in the industry. Moisture resistance is important as exposure of the material to common humidity and environmental conditions with moisture may occur. Testing for moisture resistance is typically done by simple immersion practice into a vessel containing water. The coating is observed over time. For adhesion, a more dynamic process is used. The method, ASTM D3359, *Standard Test Methods for Measuring Adhesion by Tape Test*, is used for this application. The method uses a cutting tool to inscribe a series of cross-hatched lines into and through the coating until meeting the underlying substrate. The pattern is one which is applied at a specific distance from each cut, typically the measured area is between 0.25-1.0 centimeter (cm). Once complete, a standard form of tape is applied with sticky surface directly on the inscribed cross-hatch pattern. When applied and fully adhered to the surface, the tape is then pulled away from the surface and observations are taken. The ASTM method describes an approach whereby the analyst determines the number of spaces removed as compared to the total number to achieve a ratio value, or percent. Using this approach, a determination is made regarding the pass or failure of the coating adhesion.

When cured onto a microelectronic device, the electrical properties of the invention coating may be concluded to be similar to the objective properties as a dielectric as compared to commercially available products as polyimide (PI) and bisbenzocyclobutene (BCB). Dielectric properties of these commercial products are dependent upon many variables such as thickness, cure condition, substrate material. To reach this conclusion regarding the PBI to be considered for its dielectric properties, an electrical comparison was conducted with PI and BCB. The survey was conducted on copper-coated silicon wafers and performed by an electronic device utilizing a mercury-probe with the appropriate diagnostic equipment to conduct current-voltage (I-V) comparisons. The PBI was compared as several material forms, to include its mixture in DMAC (solvent), classified as DOPE, a commercial product of PBI present in a concentration between 20-30% by weight, in the presence of an alkali metal salt lithium chloride; PBI DOPE casted onto a primer; and, PBI from a pure mixture form without lithium chloride casted onto a primer.

Figure 4:
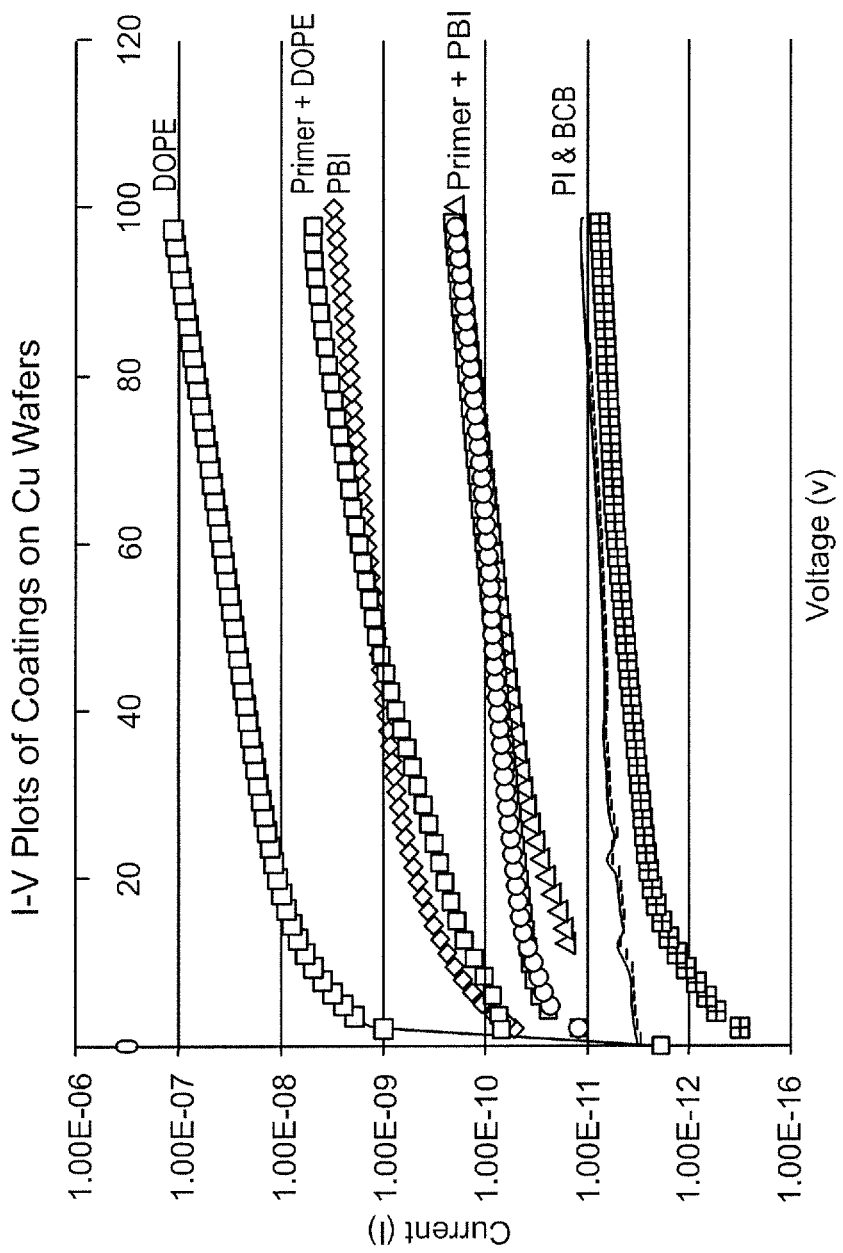
FIG. 4 is a plot of electrical testing (I-V curves) of various PBI/Polyacrylate coatings.

The results suggest that PBI coatings of the purest variety and which are cast onto a primer for improved adhesion are preferred and exhibit properties in the same range of that for the commercialized PI and BCB. The PBI coating did not experience electrical breakdown and exhibited proper electrical behavior as compared to PI and BCB (FIG. 4).

In the case where the PBI coating is applied as an adhesive, a wafer package composed of the bonded wafer to a carrier is sent through a mechanical thinning process. The thinning process is normally conducted at room temperature conditions using a horizontal rotating platter upon which the wafer package is held in intimate contact. There is a liquid media that is used to reduce friction. This media may contain mild chemistries (e.g. fluoride, ammonia, etc.) and/or fine abrasive media. The abrasive media removes gross (large) amounts of the wafer substrate while the mild chemistries are used for microscopic polishing (etching). At the completion of thinning, the package is entered into a stress relieving process, commonly carried out in a strong chemical etchant (i.e. dilute sulfuric, peroxide). The invention is desirable to be resistant to common chemistries used in the stress relief etching process. Once stress relief is completed, the package is rinsed, dried and prepared for backside processing.

As part of backside processing, patterning is completed through a nomal lithography process using photoresist and an aqueous alkaline developer. The coating is resistant to common lithography and development steps used for positive-tone photoresists. Etching is carried out at elevated temperature in a vacuum chamber using a reactive ion etch (RIE) plasma, e.g. $BF_3/BCl_3$ (boron tri-fluoride/boron tri-chloride). The RIE plasma selectively removes the wafer substrate within a pattern to produce via-holes that are continuous from the backside all the way through to a designated contact metal (etch stop) present on the front side.

Once via-hole etching is complete, the resist pattern and etch residue is removed by a cleaning process, whereby the wafer is then metalized with a blanket layer of an inert and highly conductive metal, commonly this will be gold (Au), copper (Cu), nickel (Ni), or similar material. At the chip level, the metal layer provides for rigidity and high conductivity between the backside and the front. This connectivity is required for through-chip contact in design configurations of three-dimensional packaging (3-D packaging) where the stacking of chips is common.

The thinned, backside processed, and metalized wafer is then prepared for demounting (detachment) from the temporary support and cleaning. This process is carried-out by exposure to solvent chemistry of the polar variety such as dimethylacetamide (DMAC) or similar polar solvent reagent which may be familiar to most manufacturing fabs. In the case of the coatings use as a dielectric coating, certain re-work practices may be required, whereby the removal practice is identical to that used for removal and cleans of the invention adhesive. The polar solvent has high selectivity towards the invention coating with limited or no compromise to the microelectronic substrate or the metallic devices present. The process is commonly conducted at elevated temperature and may use measures of agitation such as ultrasonic equipment. Once the substrate is cleaned, it is rinsed, dried, and observed to be in a pristine and clean state. The wafer is then ready for dicing into ICs and final packaging to the printed wire board (PWB) or other electronic use.

Although the invention has been described in terms of particular embodiments, blends of one or more of the various additives described herein can be used, and substitutes therefore, as will be know to those skilled in the art. Thus the invention is not meant to be limited to the details described herein, but only by the scope of the appended claims.

The process utilizes PBI polymer dissolved into a mixture of acrylic monomer and other agents, that when applied to microelectronic substrates and cured, allows users to protect the underlying delicate features of the device from exposure to temperatures exceeding 200° C., and depending upon the composition, may exceed 300° C. and approach the glass transition (Tg) of the pure PBI polymer, a value measured in excess of 400° C.

When the coating is applied as an adhesive to a wafer front-side surface (i.e. device area) at predetermined conditions to achieve a defined thickness, the coating penetrates and protects the device structure from the pressures associated with backside thinning. The adhesive strength of the applied coating which mounts the wafer to a carrier substrate exceeds the shear stress associated with wafer thinning, a property that is fundamental for this application.

Once cured, the coating is resistant to thermal and chemical conditions normally seen during chip performance while exposed to a wide array of environmental conditions. The coating offers electronic insulation properties that are consistent to performing as a dielectric. Additional properties of the cured coating allows the support of wafer thinning, and other processing steps used on the wafer backside. These steps include through silicon via (TSV) etching, vacuum metallization, lithography, cleans, and plating. The manner or sequence by which these steps will depend upon the customer's device platform, available tooling, and general design of their fabrication area (fab). Once finished, selective dissolution of the invention composition is achieved by using simple polar solvents (i.e. dimethylacetamide, n-methylpyrrolidone, gamma-butyrolactone) used in the industry. The removal process may occur by heated liquid spraying, in an immersion bath with agitation, or by other means consistent with standard cleaning practices in wafer cleans.

EXAMPLES

The invention is further illustrated, without limitation, by the following examples. In Examples Nos. 1-7, measurements are made by direct observations and data taken from tools common to most materials laboratories, and where necessary, optical microscopy or special instruments to gain knowledge of the properties of the final product.

Unless otherwise indicated, substrates used are quartz or silicon of various thicknesses, varying from about 100 µm to 1000 µm; for electrical measurements, the substrate is coated by a vacuum sputtering deposition process to a final thickness of 2,500 Å (0.25 µm). Application equipment includes: a spin-coater (Model CB100, Brewer Science, Inc., www.brewerscience.com); an ultraviolet (UV) light source (Sylvania 365 nm, broad-band, 0.16 W/cm2-sec); an incandescent (visible) light source (GE halogen flood lamp 75 W, or equiv, 350 nm to >750 nm); thickness profilometer (XP-1, Ambios Technology, Inc., www.ambiostech.com); a Hg probe using a dot and ring contact, Model 802B-150, an HP 4140B picoammeter source supported by an MDC measurement system with an I-V plotting program @ 10 mv steps from 0-1V. This equipment forms the basis for the survey to be conducted which the invention will be demonstrated.

Table 1 sets forth the materials used in the following Examples.

TABLE 1

| # | Material | Trade Name | Manufacturer |
|---|---|---|---|
| 1 | PBI polymer powder, 0.8 IV (intrinsic viscosity), 100 mesh screened | Celazole ™ | PBI Performance Products, Inc., www.PBIgold.com |
| 2 | PBI polymer solution, 26% in DMAC (dimethylacetamide), contains lithium chloride (LiCl), identified as PBI "Dope" | Celazole ™ | PBI Performance Products, Inc., www.PBIgold.com |
| 3 | Polar organic solvents as n,n-Dimethyl-acetamide (DMAC), n-methylpyrrolidone (NMP) | none | Sigma-Aldrich, www.sigma-aldrich.com |
| 4 | n,n-Dimethyl-acrylamide (DMAA) | AGEFLEX ™-(1) | (1) CIBA Specialty Chemicals (BASF), www.BASF.com |
| 5 | Hydroxyethyl methacrylate (HEMA, Rocryl ™ 400) | Rocryl ™ | Rohm and Haas Company (DOW) www.rohmhaas.com, www.dow.com |
| 6 | Novolacs of the phenol-formaldehyde variety | Rezicure ™ | SI Group, Inc., www.sigroup.com |
| 7 | Epoxy novolacs, epoxy resins (DEN & DER) | D.E.N ™ and D.E.R ™ | The DOW Chemical Company, www.DOW.com |
| 8 | Photoinitiators as a range of products with absorption curves in both the UV and VIS spectral regions | (1) Irgacure ™ and Darocure ™ (2) Genocure ™ (3) Lucirin ™ | (1) CIBA Specialty Chemicals (BASF), www.BASF.com (2) Rahn AG, www.rahn-group.com (3) BASF Chemical Corporation, www.BASF.com |
| 9 | Thermal radical initiators (TRI) as: (1) 2,2'-azobisiso-butyronitrile (AIBN) and other azo products, ammonium persulfate (APS) and related other persulfates (2) Dibenzoyl peroxide, and related organic peroxides | (1) none (2) Luperox ™ | (1) Sigma-Aldrich, www.sigma-aldrich.com (2) Arkema, Inc., www.arkema-inc.com |

Example 1

Dissolution of PBI Polymer Powder into Acrylates

PBI polymer is dissolved in various acrylates and solvents mixture and the stability of those solutions is noted in Tables 2 & 3. The mixing (solvation) is accomplished with agitation (e.g., stirring) and heat. For example, the PBI polymer powder is mixed into DMAA liquid monomer. The mix vessel is transferred to a hot plate and mixing with heating commences. Heating continues until a temperature of approximately 130-140° C. is reached. This temperature is held for approximately 1 hour. During this time, the solution begins to turn dark and viscosity rises, indicating that PBI polymer dissolution is progressing. Once dissolution is complete, the final mixture is filtered through a cartridge filter (e.g., desired pore size not greater than 5 µm) for use in coating applications.

TABLE 2

| PBI Polymer (%) | Solvent | LiCl Added | Procedure & Chemistry | Observations (ambient) | Shelf Life (days) |
|---|---|---|---|---|---|
| 10 | DMAA, or DMAA + DMAC | No | PBI Polymer mix with solvent with heat | Dissolved, pourable, low viscosity | >30 |
| 10 | DMAA + HEMA | No | PBI Polymer mix with solvent with heat | Dissolved, pourable, low viscosity | <30 |
| 10 | DMAC + HEMA | No | PBI Polymer mix with solvent with heat | Dissolved, pourable, low viscosity | <30 |
| 10 | HEMA | No | PBI Polymer mix with solvent with heat | Not compatible, no dissolving | N/A |
| 15 | DMAA, or DMAA + DMAC | No | PBI Polymer mix with solvent with heat | Dissolved, pourable, moderate viscosity | >30 |
| 20 | DMAA, or DMAA + DMAC | No | PBI Polymer mix with solvent with heat | Dissolved, pourable, high viscosity | <30 |
| 25 | DMAA, or DMAA + DMAC | No | PBI Polymer mix with solvent with heat | Dissolved, not pourable | <10 |
| 30 | DMAA, or DMAA + DMAC | No | PBI Polymer mix with solvent with heat | Dissolved, gel | <5 |

TABLE 3

| PBI Polymer (%) | Liquid Carrier (solvent) | LiCl Added | Chemistry | Observations (ambient) | Shelf Life (days) |
|---|---|---|---|---|---|
| 10 | DMAA, or DMAA + DMAC | Yes | PBI Polymer (item #1, Table 1) mix with liquid carrier (solvent) with heat | Dissolved, pourable, low viscosity | >60 |
| 30 | DMAA, or DMAA + DMAC | Yes | PBI Polymer (item #1, Table 1) mix with liquid carrier (solvent) with heat | Dissolved, gel | >60 |

Results of this work suggest DMAA, and mixtures of DMAA with DMAC or other acrylics, are preferred for dissolving PBI polymer. From this work, DMAA and DMAC will be used for future experiments to demonstrate the coating properties of the invention.

Example 2

Compositions with Photoinitiators

A PBI polymer/acrylate monomer solution is mixed with a photoinitator and then polymerized to investigate the efficacy of various photoinitiators. A PBI polymer is dissolved in the monomer, n,n-dimethylacrylamide (DMAA), and this solution is mixed with the another monomer, hydroxymethyl acrylate (HEMA), in a ratio of 1:1. The final mixture is described as: PBI:DMAA:HEMA as 5:45:50 by weight %. To separate aliquots of this final mixture, a UV/VIS photoinitiator is added at designated at a concentration of 5% by weight (to obtain a 5 wt % concentration of the initiator in the final mixture). Once mixed, each aliquot is applied to a glass substrate (1 mm thickness) and subject to exposure conditions with, first stage, the necessary ultraviolet/visible source for a period of 5 minute and followed with, a second stage, a 5 minute at 100° C. (hot plate exposure). Curing observations are recorded for each stage. The initiators are listed in Table 4 with results of the observations are set forth in Tables 5 & 6.

TABLE 4

| Initiator/ Manufacturer | Compound | Wavelength λ (nm) |
|---|---|---|
| Genocure CQ, Rahn USA Corp. | Camphorquinone | 460-480 |
| Irgacure 784, CIBA Specialty Chem. (BASF) | Bis(.eta.5-2,4-cylcopentadien-1-yl)-bis(2,6-difluoro-3-(1H-pyrrol-1-yl)-phenyl) titanium | 380-480 |
| Genocure DETX, Rahn USA Corp. | 2,4-Diethylthioxanthone | 384 |
| Genocure ITX, Rahn USA Corp. | Thioxanthone | 380 |

TABLE 4-continued

| Initiator/ Manufacturer | Compound | Wavelength λ (nm) |
|---|---|---|
| Lucirin TPO-XL, BASF | Combination: 2,4,6-trimethylbenzoyldiphenylphosphine oxide, and phenyl phosphinate | 375 |
| Irgacure 2022, CIBA Specialty Chem. (BASF) | BAPO/∝-hydroxyketone (Irgacure 819:Darocure 1173, 20:80) | 365 |
| Irgacure 819, CIBA Specialty Chem. (BASF) | Phosphine oxide, phenyl bis (2,4,6-trimethyl benzoyl) | 365 |
| Irgacure 2959, CIBA Specialty Chem. (BASF) | 2-Hydroxy-1-[4-(2-hydroxyethoxy)phenyl]-2-methyl-1-propanone | 365 |
| Darocure 1173, CIBA Specialty Chem. (BASF) | 2-Hydroxy-2-methyl-1-phenyl-1-propanone | 365 |
| Irgacure 379, CIBA Specialty Chem. (BASF) | 2-Dimethylamino-2-(4-methyl-benzyl)-1-(4-morpholin-4-yl-phenyl)-butan-1-one | 320 |
| Irgacure 907, CIBA Specialty Chem. (BASF) | 2-Methyl-1[4-(methylthio)phenyl]-2-morpholineopropan-1-one | 300 |
| Irgacure 250, CIBA Specialty Chem. (BASF) | Iodonium, (4-methylphenyl)[4-(2-methylpropyl) phenyl]-, hexafluorophosphate(1-) | 250 |
| Darocure 4265, CIBA Specialty Chem. (BASF) | MAPO/∝-Hydroxyketone (Darocure TPO:1173, 50:50) | 250 |

TABLE 5

| Initiator | Preferred Absorp. (nm) | λ (nm) | Observation upon exposure | Observation after heat |
|---|---|---|---|---|
| Genocure CQ | 460-480 | 365 | Gel forms | N/C - gel |
| Irgacure 784 | 380-480 | 365 | Gel forms | Cure - solid |
| Genocure DETX | 384 | 365 | Gel forms | N/C - gel |
| Genocure ITX | 380 | 365 | N/C - liquid | N/C - gel |
| Lucirin TPO-XL | 375 | 365 | Gel forms | Cure - solid |
| Irgacure 2022 | 365 | 365 | Gel forms | N/C - gel |
| Irgacure 819 | 365 | 365 | Gel forms | Cure - solid |
| Irgacure 2959 | 365 | 365 | Gel forms | Cure - solid |
| Darocure 1173 | 365 | 365 | Gel forms | Cure - solid |
| Irgacure 379 | 320 | 365 | Gel forms | N/C - gel |
| Irgacure 907 | 300 | 365 | Gel forms | N/C - gel |
| Irgacure 250 | 250 | 365 | Gel forms | Cure - solid |
| Darocure 4265 | 250 | 365 | Gel forms | Cure - solid |

N/C—No change

TABLE 6

| Initiator | Preferred Absorp. (nm) | λ (nm) | Observation after exposure | Observation after heat |
|---|---|---|---|---|
| Genocure CQ | 460-480 | 350-800 nm | N/C - liquid | N/C - gel |
| Irgacure 784 | 380-480 | 350-800 nm | N/C - liquid | N/C - gel |
| Genocure DETX | 384 | 350-800 nm | N/C - liquid | N/C - gel |
| Genocure ITX | 380 | 350-800 nm | N/C - liquid | N/C - gel |
| Lucirin TPO-XL | 375 | 350-800 nm | Gel forms | N/C - gel |
| Irgacure 2022 | 365 | 350-800 nm | N/C - liquid | N/C - gel |
| Irgacure 819 | 365 | 350-800 nm | N/C - liquid | N/C - gel |
| Irgacure 2959 | 365 | 350-800 nm | N/C - liquid | N/C - gel |
| Darocure 1173 | 365 | 350-800 nm | N/C - liquid | N/C - gel |
| Irgacure 379 | 320 | 350-800 nm | N/C - liquid | N/C - gel |
| Irgacure 907 | 300 | 350-800 nm | N/C - liquid | N/C - gel |
| Irgacure 250 | 250 | 350-800 nm | N/C - liquid | N/C - gel |
| Darocure 4265 | 250 | 350-800 nm | N/C - liquid | N/C - gel |

Based upon the foregoing observations, UV curing is preferred over visible light curing. PBI polymer/acrylate monomer mixtures with the photoinitiators Irgacure 784, Lucirin TPO-XL, Irgacure 819, Irgacure 2959, Darocure 1173, Irgacure 250, and Irgacure 4265, produce a rigid structure (e.g., suitable for use as a coating or similar applications).

Example 3

Compositions with Thermal Radical Initiators (TRI)

A PBI polymer/acrylate monomer solution is mixed with thermal radical initiators (TRI) and then polymerized to investigate the efficacy of various TRIs. PBI polymer is dissolved in the monomer, n,n-dimethylacrylamide (DMAA) and tested alone as a two component polymer matrix, PBI:DMAA at a concentration of approximately 20% by weight of PBI. To separate aliquots of this solution, the TRI initiators 2,2'-azobisiso-butyronitrile (AIBN), ammonium persulfate (APS), and tetrabutylammonium salt (TBAPS) are added at designated weight concentrations. Once mixed, each is applied to aluminum dishes and transferred to a 140° C. hot plate for two intervals of 15 min each. Curing observations and weights on an analytical balance are recorded for each stage (Table 7).

TABLE 7

| # | Initiator (0.5% weight concentration) | % Solids Remaining after 15 mins | % Solids Remaining after 30 mins |
|---|---|---|---|
| 1 | None | 52.34 | 47.62 |
| 2 | AIBN | 80.16 | 80.32 |
| 3 | Ammonium Persulfate (APS) | 81.80 | 79.19 |
| 4 | Tetrabutylammonium Salt (TBAPS) | 62.94 | 69.57 |

Results suggest that TRI addition resulted in a minimum of 10% increase in solids, and in some cases, increased to 30%. When used alone, the acrylic monomer, DMAA, produced a solids product that is <50%. From this work, AIBN is chosen for future experiments to demonstrate the coating properties of the invention.

Example 4

PBI Compositions with Co-Polymers, AIBN, and Variable Sample Size

A PBI polymer/acrylate monomer solution is mixed with a co-polymer (epoxy novolac) and an initiator, and then polymerized. PBI polymer is dissolved in the monomer, n,n-dimethylacrylamide (DMAA) to form a two component polymer matrix, PBI:DMAA, at various weight concentrations 5-20% (by weight of PBI), and mixed with copolymer (epoxy novolac, D.E.N. 439) and a polar solvent, dimethylacetamide, see Table 8 (% weight are based on the weight of PBI).

TABLE 8

| Item # | PBI | DMAA | DEN 439 | DMAC | AIBN | Total % Solids Theoretical |
|---|---|---|---|---|---|---|
| A | 20% | 80% | -0- | -0- | -0- | 100% |
| B | 5% | 19% | 18% | 58% | 0.5% | 42% |
| C | 14% | 57% | 6% | 23% | 0.5% | 77% |
| D | 5% | 19% | 36% | 41% | 0.5% | 59% |
| E | 14% | 57% | 12% | 17% | 0.5% | 83% |

In separate aliquots of these mixtures, the TRI initiator, 2,2'-azobisiso-butyronitrile (AIBN), is added at a concentration of 0.5% by weight. Once mixed, each is applied to aluminum dishes at variable amounts (sample sizes of 0.25 g (1), 0.5 g (2), and 1.0 g (3)) and transferred to a 140° C. hot plate for two intervals of 15 min each. Curing observations and weights on an analytical balance are recorded for each stage (Table 9). Comparison of the observed solids and the theoretical solids with their % change are calculated (Table 10).

TABLE 9

| # | % Solids Remaining after 15 mins | % Solids Remaining after 30 mins | Theo. % Sol. | Thickness (mm) |
|---|---|---|---|---|
| A1 | 48.32 | 48.13 | 100 | 0.071 |
| A2 | 72.52 | 72.19 | 100 | 1.476 |
| A3 | 78.12 | 79.30 | 100 | 1.272 |
| B1 | 40.71 | 40.71 | 42 | 0.044 |
| B2 | 37.78 | 37.47 | 42 | 0.040 |
| B3 | 44.07 | 43.69 | 42 | 0.095 |
| C1 | 51.24 | 50.96 | 77 | 0.093 |
| C2 | 69.79 | 69.57 | 77 | 0.132 |
| C3 | 64.86 | 64.31 | 77 | 0.161 |
| D1 | 54.71 | 54.35 | 59 | 0.088 |
| D2 | 58.10 | 58.26 | 59 | 0.158 |
| D3 | 57.75 | 57.28 | 59 | 0.132 |
| E1 | 57.07 | 56.89 | 83 | 0.074 |
| E2 | 58.67 | 58.59 | 83 | 0.141 |
| E3 | 79.98 | 79.36 | 83 | 0.805 |

TABLE 10

| # | Amount (g) | Ave Solids (%) | Theor. % | % Change |
|---|---|---|---|---|
| A1 | 0.25 | 48.13 | 100 | 52% |
| A2 | 0.5 | 72.19 | 100 | 28% |
| A3 | 1 | 79.3 | 100 | 21% |
| B1 | 0.25 | 40.71 | 42 | 3% |
| B2 | 0.5 | 37.47 | 42 | 11% |
| B3 | 1 | 43.69 | 42 | -4% |
| C1 | 0.25 | 50.96 | 77 | 34% |
| C2 | 0.5 | 69.57 | 77 | 10% |
| C3 | 1 | 64.31 | 77 | 16% |
| D1 | 0.25 | 54.35 | 59 | 8% |
| D2 | 0.5 | 58.26 | 59 | 1% |
| D3 | 1 | 57.28 | 59 | 3% |
| E1 | 0.25 | 56.89 | 83 | 31% |
| E2 | 0.5 | 58.59 | 83 | 29% |
| E3 | 1 | 79.36 | 83 | 4% |

Results suggest that achieving a PBI polymer coating of greater than 1 mm thickness and of nearly 80% solids level, as cured, is proven. A reduced sample size (i.e. 0.25 g) resulted in the greatest % change in solids measured as compared to theoretical solids. Copolymerizating with epoxy novolac materials are achieved in DMAA mixtures. The organic solvent, DMAC, may aid in curing efficiency as compared to theoretical solids.

Example 5

PBI Compositions with Co-Polymers, AIBN, and Variable Sample Size

A PBI polymer/acrylate monomer solution is mixed with a co-polymer (phenol-formaldehyde novolac) and an initiator, and then polymerized. PBI polymer is dissolved in the monomer, n,n-dimethylacrylamide (DMAA), to form a two component polymer matrix, PBI:DMAA, at various weight concentrations 5-20% (by weight of PBI), and then mixed with a copolymer (phenol-formaldehyde novolac, Rezicure) and a polar solvent, dimethylacetamide, see mixtures 1-5 in Table 11. AIBN is added at a concentration of 0.5% by weight to all solutions. (% weight are based on the weight of PBI)

TABLE 11

| # | % PBI | % phenol-formaldehyde novolac | % AIBN | % DMAA | % DMAC |
|---|---|---|---|---|---|
| 1 | 13 | -0- | 0.5 | 45 | 41.5 |
| 2 | 13 | 11.25 | 0.5 | 33.75 | 41.5 |
| 3 | 6.5 | 17.5 | 0.5 | 52.5 | 23 |
| 4 | 10.4 | 27.5 | 0.5 | 27.5 | 34.1 |
| 5 | 13 | 22.5 | 0.5 | 22.5 | 41.5 |

Once mixed, each is applied to aluminum dishes and transferred to a 140° C. hot plate for two intervals of 15 min each. Curing observations and weights on an analytical balance are recorded for each stage, as well as immersion moisture exposure (water test) conducted on all coatings for moisture resistance (Tables 12 & 13). Comparison of the observed solids and the theoretical solids with their % change are calculated (Table 14).

TABLE 12

| # | Initial Wt. | 15 min @ 140 C. wt. | 15 min @ 200 C. wt. | Water Test |
|---|---|---|---|---|
| 1 | 1.0829 | 0.7196 | 0.6757 | Fail |
| 2 | 1.0858 | 0.7330 | 0.6596 | Pass |
| 3 | 1.1321 | 0.8510 | 0.7892 | Pass |
| 4 | 1.0741 | 0.7589 | 0.7132 | Pass |
| 5 | 1.0785 | 0.7027 | 0.6247 | Pass |

TABLE 13

| # | Initial Wt. | 15 min @ 110 C. wt. | 15 min @ 200 C. wt. | Water Test |
|---|---|---|---|---|
| 1 | 1.0610 | 0.7972 | 0.6971 | Fail |
| 2 | 1.0544 | 0.6591 | 0.5674 | Pass |
| 3 | 1.0324 | 0.5602 | 0.4960 | Pass |
| 4 | 1.0289 | 0.6891 | 0.6193 | Pass |
| 5 | 1.1131 | 0.7423 | 0.6324 | Pass |

TABLE 14

| # | % Solids Theoretical | % solids remaining @ 140° C., 15 min | % solids remaining @ 200° C., 15 min | % Difference from Theoretical |
|---|---|---|---|---|
| 1 | 58.5 | 70.8 | 64.1 | −9.5% |
| 2 | 58.5 | 65.0 | 57.3 | 2.1% |
| 3 | 77.0 | 64.8 | 58.9 | 23.6% |
| 4 | 65.9 | 68.9 | 63.3 | 3.9% |
| 5 | 58.5 | 66.0 | 57.4 | 1.9% |

Results suggest that a PBI polymer coating with novolac copolymers is achieved. Mixtures with AIBN at theoretical values above 50% are reached using rapid baking programs of approximately 30 min in duration and a maximum temperature of 200° C. The cure program suggests that % Error (% difference) compared to theoretical solids can achieve results <5%, and in some cases, <2%. Results with high % Error (% difference) from theoretical suggest excess solvent content, as DMAC, or limited copolymer present. Moisture resistance is supported by the presence of novolac copolymer.

Example 6

PBI Compositions-Smoothness, Adhesion, and Dielectric Properties

PBI polymer composition performance for coating uniform, coating adhesion, and dielectric properties are examined. In Tables 15 and 16, thickness uniformity is examined. In Table 17, substrate adhesion is examined. In Table 18, dielectric properties are examined.

Inventive samples are compared with commercially available competitive materials, polyimide (PI) and bisbenzocyclobutene (BCB). All reported PBI mixtures contained 10-15 weight % PBI. PBI mixtures were prepared from the pure-form PBI powder as the 100 mesh screen size with I-V 0.8 dL/g, dissolved in the monomer, n,n-dimethylacrylamide (DMAA) and the organic solvent, dimethylacetamide (DMAC). PBI+LiCl+DMAC is PBI Dope.

A primer was examined to determine its impact on adhesion. The primer is composed of novolac epoxy and novolac resins of the D.E.N., D.E.R., and Rezicure varieties with the addition of amines to achieve curing of the coating. The primer used in Tables 15-18 consisted of Rezicure 3056 mixed with the amines MDEA (methyldiethanolamine, CAS=105-59-9, BP=247.3° C.) and MEA (monethanolamine, CAS=141-43-5, BP=171° C.), in a mixture ratio of 10:1 as resin:amine, dissolved in a casting solvent mixture of approximately 5% by weight of solids dissolved into the solvent.

All mixtures were coated either directly onto the substrate or on the primer which was directly coated on the substrate. Coatings were applied to a quartz substrate. The substrate had a minimum surface roughness, measured as Rq (RMS, root mean square), of <100 Å (angstroms). Curing was by baking on a hot plate at 140° C. for 60 min. At this temperature, adequate curing is expected via TRI and evaporation. Results of the coating thickness (Angstroms) and smoothness (i.e. uniformity) are described in Tables 15 & 16, whereby C and E represent center and edge measurement, respectively. Adhesion was tested by a tape test, ASTM D3359-95a (cross-hatch cut; fail=≥>50% coating removed).

TABLE 15

| # | Description | C1 | C2 | Std. deviation | Average | % Change |
|---|---|---|---|---|---|---|
| 1 | PBI + DMAC | 22566 | 21643 | 653 | 22105 | 2.95 |
| 2 | PBI + LiCl + DMAC | 31770 | 31400 | 262 | 31585 | 0.83 |
| 3 | Primer + PBI + DMAC | 30183 | 30181 | 1 | 30182 | 0.00 |
| 4 | Primer + PBI + DMAA + DMAC | 20926 | 20945 | 13 | 20936 | 0.06 |
| 5 | Primer + PBI + DMAA + DMAC | 25508 | 25508 | 0 | 25508 | 0.00 |
| 6 | Primer + PBI + DMAA + DMAC | 33956 | 33964 | 6 | 33960 | 0.02 |
| 7 | Polyimide | 11280 | 11057 | 158 | 11169 | 1.41 |
| 8 | BCB | 230924 | 231552 | 444 | 231238 | 0.19 |

TABLE 16

| # | Description | E1 | E2 | Std. deviation | Average | % Change |
|---|---|---|---|---|---|---|
| 1 | PBI + DMAC | 22975 | 22231 | 526 | 22603 | 2.33 |
| 2 | PBI + LiCl + DMAC | 33680 | 33711 | 22 | 33696 | 0.07 |
| 3 | Primer + PBI + DMAC | 32041 | 32037 | 3 | 32039 | 0.01 |
| 4 | Primer + PBI + DMAA + DMAC | 21574 | 21774 | 141 | 21674 | 0.65 |
| 5 | Primer + PBI + DMAA + DMAC | 25598 | 25591 | 5 | 25595 | 0.02 |
| 6 | Primer + PBI + DMAA + DMAC | 31229 | 31223 | 4 | 31226 | 0.01 |
| 7 | Polyimide | 13194 | 13253 | 42 | 13224 | 0.32 |
| 8 | BCB | 236650 | 236645 | 4 | 236648 | 0.00 |

TABLE 17

| # | Smooth? Y/N | Cross-hatch | Tape-Pull |
|---|---|---|---|
| 1 | Y | Pass | Pass |
| 2 | N | Pass | Fail |
| 3 | N | Pass | Fail |
| 4 | Y | Pass | Pass |
| 5 | Y | Pass | Pass |
| 6 | Y | Pass | Fail |
| 7 | Y | Pass | Pass |
| 8 | Y | Pass | Pass |

TABLE 18

| # | Description | Average Resistance (Ohms) |
|---|---|---|
| 1 | PBI + DMAC | 4.1E+10 |
| 2 | PBI + LiCl + DMAC | 1.4E+09 |
| 3 | Primer + PBI + DMAC | 4.2E+10 |
| 4 | Primer + PBI + DMAA + DMAC | 6.1E+11 |
| 5 | Primer + PBI + DMAA + DMAC | 5.1E+11 |
| 6 | Primer + PBI + DMAA + DMAC | 5.6E+11 |
| 7 | Polyimide | 1.1E+13 |
| 8 | BCB | 6.7E+12 |

Results suggest that coatings of PBI polymer are able to produce very smooth coatings at <5 um (microns) thickness. The uniformity (smoothness) is calculated as total thickness variation (TTV) in this case as % change in standard deviation. All % change values are <1%, and in most cases, are <0.1%. Adhesion test results suggest the materials meet the stringent method by ASTM D3359, tape pull testing. Substrate electrical testing by I-V methods suggest that PBI coatings on a primer exhibit dielectric properties by resistance measurement is consistent with commercial products, polyimide and bisbenzocyclobutene (BCB).

Example 7

PBI Compositions-Adhesive Support with Thermal Resistance

PBI compositions provide adhesive support to a fixture when cured and placed into a furnace having temperatures exceeding 250° C. PBI was coated between two metallic substrates, cured, weighted, and tested under a thermal program. The weights are oriented in a shear direction (i.e. 90° to the bondline) and applied at a force level that is up to 1 pound per square inch (1 psi). The thermal program is taken to 250° C. For comparison, other competitive commercial materials are also tested to demonstrate adhesive performance at these temperature ranges.

TABLE 19

| # | Material | Max Temperature (° C.) | Discoloration |
|---|---|---|---|
| 1 | Rosin | 185 | Yes |
| 2 | Rosin-Urethane | 130 | No |
| 3 | Rubber (polyisobutylene) | 220 | No |
| 4 | PBI polymer* | >250 | No |

*Note: PBI polymer no failure at max temperature of 250° C.

Results suggest that coatings of PBI polymer are able to produce adhesive properties in bonding two substrates together and sustain temperatures beyond 250° C. This work demonstrates sufficient support and performance to withstand shear forces that must be overcome for a material to act as a bonding adhesive for microelectronic substrates in thinning processes.

The present invention may be embodied in other forms without departing from the spirit and the essential attributes thereof, and, accordingly, reference should be made to the appended claims, rather than to the foregoing specification, as indicated the scope of the invention.

What is claimed is:

1. A coating comprising polybenzimidazole (PBI) embedded within a matrix of a polyacrylate solely derived from a free radical polymerization of an acrylate monomer, the PBI consisting of a condensation product of a bis-ortho-diaminophenyl compound and a dicarboxylic acid or a benzimidazole-forming derivative thereof.

2. The coating according to claim 1 wherein said acrylate monomer is selected from the group consisting of acrylates, methacrylates, acrylamides, methacrylamides, hydroxyl acrylates, and combinations thereof.

3. The coating according to claim 1 further comprising a novolac resin.

4. The coating according to claim 1 wherein the PBI polymer comprises 0.5-40.0 weight % of the coating.

5. The coating according to claim 1 wherein the polyacrylate comprises 0.1-99.0 weight % of the coating.

6. The coating of claim 1 wherein the PBI polymer comprises 5-25 weight % of the coating and wherein the polyacrylate comprises 50-95 weight % of the coating.

7. The coating according to claim 1 wherein said acrylate monomer has a formula of

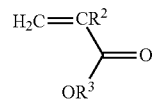

wherein $R^2$ represents the following: hydrogen (—H), amine (—NH$_2$), methyl (—CH$_3$), hydroxyl (—OH), alcohol (—CH$_2$OH), —C$_n$H$_{(2n+1)}$ where n varies from 2-20, —C$_n$H$_{(2n)}$OH where n varies from 2-20, —C$_6$X$_5$ where X represents hydrogen (—H), a halogen (—F, —Br, —Cl, —I), hydroxyl (—OH), —COOH; and —COOR$^4$ groups where $R^4$ represents hydrogen (—H), amine (—NH$_2$), methyl (—CH$_3$), hydroxyl (—OH), alcohol (—CH$_2$OH), —C$_n$H$_{(2n+1)}$ where n varies from 2-20, or —C$_n$H$_{(2n)}$OH where n varies from 2-20, and wherein $R^3$ represents the following: hydrogen (—H), amine (—NH$_2$), methyl (—CH$_3$), hydroxyl (—OH), alcohol (—CH$_2$OH), —C$_n$H$_{(2n+1)}$ where n varies from 2-20, —C$_n$H$_{(2n)}$OH where n varies from 2-20, —C$_6$X$_5$, where X represents hydrogen (—H), a halogen (—F, —Br, —Cl, —I), hydroxyl (—OH), —COOH; and —COOR$^4$ groups where $R^4$ represents the hydrogen (—H), amine (—NH$_2$), methyl (—CH$_3$), hydroxyl (—OH), alcohol (—CH$_2$OH), —C$_n$H$_{(2n+1)}$ where n varies from 2-20, or —C$_n$H$_{(2n)}$OH where n varies from 2-20.

8. The coating according to claim 1 further comprising a surfactant.

9. The coating according to claim 1 further comprising an emulsifier.

10. A coating comprising a polybenzimidazole (PBI) and a novolac resin embedded within a matrix of a polyacrylate solely derived from a free radical polymerization of an acrylate monomer.

11. The coating according to claim 10 wherein said acrylate monomer is selected from the group consisting of acrylates, methacrylates, acrylamides, methacrylamides, hydroxyl acrylates, and combinations thereof.

12. The coating according to claim 10 wherein the PBI polymer comprises 0.5-40.0 weight % of the coating.

13. The coating of claim 10 wherein the PBI polymer comprises 5-25 weight % of the coating and wherein the polyacrylate comprises 50-95 weight % of the coating.

14. A coating comprising a polybenzimidazole (PBI) and a surfactant embedded within a matrix of a polyacrylate solely derived from a free radical polymerization of an acrylate monomer.

15. The coating according to claim 14 wherein said acrylate monomer is selected from the group consisting of acrylates, methacrylates, acrylamides, methacrylamides, hydroxyl acrylates, and combinations thereof.

16. The coating according to claim 14 wherein the PBI polymer comprises 0.5-40.0 weight % of the coating.

17. The coating of claim 14 wherein the PBI polymer comprises 5-25 weight % of the coating and wherein the polyacrylate comprises 50-95 weight % of the coating.

18. A coating comprising a polybenzimidazole (PBI) and an emulsifier embedded within a matrix of a polyacrylate solely derived from a free radical polymerization of an acrylate monomer.

19. The coating according to claim 18 wherein said acrylate monomer is selected from the group consisting of acrylates, methacrylates, acrylamides, methacrylamides, hydroxyl acrylates, and combinations thereof.

20. The coating according to claim 18 wherein the PBI polymer comprises 0.5-40.0 weight % of the coating.

21. The coating of claim 18 wherein the PBI polymer comprises 5-25 weight % of the coating and wherein the polyacrylate comprises 50-95 weight % of the coating.

\* \* \* \* \*